(12) United States Patent
Pathipati

(10) Patent No.: US 12,441,210 B2
(45) Date of Patent: Oct. 14, 2025

(54) FLEET CHARGING STATION ARCHITECTURE

(71) Applicant: Zoox, Inc., Foster City, CA (US)

(72) Inventor: Vamsi Krishna Pathipati, San Carlos, CA (US)

(73) Assignee: Zoox, Inc., Foster City, CA (US)

( * ) Notice: Subject to any disclaimer, the term of this patent is extended or adjusted under 35 U.S.C. 154(b) by 340 days.

(21) Appl. No.: 17/358,767

(22) Filed: Jun. 25, 2021

(65) Prior Publication Data

US 2022/0410755 A1 Dec. 29, 2022

(51) Int. Cl.
*B60L 53/67* (2019.01)
*B60L 53/36* (2019.01)
*B60L 53/62* (2019.01)
*B60L 58/12* (2019.01)
*G05D 1/00* (2024.01)
*H02J 7/00* (2006.01)
*H02J 7/04* (2006.01)

(52) U.S. Cl.
CPC .............. *B60L 53/67* (2019.02); *B60L 53/36* (2019.02); *B60L 53/62* (2019.02); *B60L 58/12* (2019.02); *G05D 1/0225* (2013.01); *H02J 7/0013* (2013.01); *H02J 7/0047* (2013.01); *H02J 7/04* (2013.01)

(58) Field of Classification Search
CPC .................................................... H02J 7/0013
See application file for complete search history.

(56) References Cited

U.S. PATENT DOCUMENTS

| 5,808,442 A | * | 9/1998 | Kaite | ................... H01M 10/441 320/148 |
| 5,952,813 A | * | 9/1999 | Ochiai | .................... B60L 53/14 320/DIG. 13 |
| 6,545,447 B1 | * | 4/2003 | Smith | .................... H02J 7/0031 320/135 |
| 7,109,604 B2 | * | 9/2006 | Kablaoui | ................ B60L 58/40 307/29 |

(Continued)

FOREIGN PATENT DOCUMENTS

| CN | 107117046 A | * | 9/2017 | .............. B60L 53/64 |
| DE | 102019117613 A1 | * | 1/2020 | .............. B60L 53/60 |

(Continued)

OTHER PUBLICATIONS

CN107117046_Translation,Weber,Vehicle Charging System,2017.*

(Continued)

*Primary Examiner* — Tynese V Mcdaniel
(74) *Attorney, Agent, or Firm* — EIP US LLP

(57) ABSTRACT

A charging system includes a charging station having input configured to receive a first type of electrical power, and a power converter connected to the input. The power converter is configured to convert the first type of electrical power from the input to a second type of electrical power different to the first type of electrical power, the second type of electrical power including DC electrical power. The charging station has outputs connected to the power converter, the outputs configured such that DC electrical power is providable to each of the outputs simultaneously. Each of the outputs is configured to connect to a respective electric vehicle for charging of the electric vehicle.

19 Claims, 9 Drawing Sheets

(56) References Cited

U.S. PATENT DOCUMENTS

| | | | | |
|---|---|---|---|---|
| 8,421,400 | B1* | 4/2013 | Khanna | H02J 7/00 |
| | | | | 320/101 |
| 10,536,015 | B2* | 1/2020 | Inskeep | B60L 50/40 |
| 10,790,680 | B1* | 9/2020 | Nguyen | H02J 7/0019 |
| D905,634 | S* | 12/2020 | Inskeep | D13/110 |
| 2005/0078423 | A1* | 4/2005 | Kim | H02J 7/0063 |
| | | | | 361/90 |
| 2005/0209747 | A1* | 9/2005 | Yakes | B60K 6/46 |
| | | | | 701/22 |
| 2009/0024858 | A1* | 1/2009 | Hijazi | G06F 1/30 |
| | | | | 713/323 |
| 2010/0270968 | A1* | 10/2010 | Reese | H02J 7/0069 |
| | | | | 320/103 |
| 2012/0038320 | A1* | 2/2012 | Kabasawa | H02J 7/0019 |
| | | | | 320/112 |
| 2012/0091972 | A1 | 4/2012 | Narel et al. | |
| 2012/0133337 | A1* | 5/2012 | Rombouts | G07F 15/006 |
| | | | | 320/155 |
| 2012/0187897 | A1* | 7/2012 | Lenk | H02J 7/00308 |
| | | | | 320/101 |
| 2013/0002197 | A1* | 1/2013 | Hernandez | B60L 53/67 |
| | | | | 320/109 |
| 2013/0009605 | A1* | 1/2013 | Hongo | H01M 10/441 |
| | | | | 320/134 |
| 2013/0057209 | A1 | 3/2013 | Nergaard et al. | |
| 2013/0175990 | A1* | 7/2013 | Jung | H02J 5/00 |
| | | | | 320/109 |
| 2013/0200845 | A1* | 8/2013 | Bito | H02J 7/007194 |
| | | | | 320/109 |
| 2013/0257146 | A1* | 10/2013 | Nojima | B60L 53/22 |
| | | | | 307/9.1 |
| 2014/0197798 | A1* | 7/2014 | Hongo | H01M 10/052 |
| | | | | 320/134 |
| 2014/0320083 | A1* | 10/2014 | Masuda | B60L 58/12 |
| | | | | 320/109 |
| 2016/0001719 | A1* | 1/2016 | Frost | B60R 16/033 |
| | | | | 307/20 |
| 2016/0096438 | A1* | 4/2016 | Grimes | B60L 53/18 |
| | | | | 320/109 |
| 2016/0193932 | A1 | 7/2016 | Vaghefinazari | |
| 2017/0246962 | A1* | 8/2017 | Weber | B60L 53/12 |
| 2018/0154791 | A1* | 6/2018 | Homma | B60L 53/51 |
| 2018/0257492 | A1* | 9/2018 | O'Hara | H01M 10/0525 |
| 2018/0342883 | A1* | 11/2018 | Inskeep | H02J 7/0045 |
| 2019/0229544 | A1* | 7/2019 | Inskeep | H02J 1/10 |
| 2019/0296565 | A1* | 9/2019 | Connolly | B60L 3/0023 |
| 2020/0072177 | A1* | 3/2020 | Clarke | F02N 11/12 |
| 2020/0290474 | A1 | 9/2020 | Cashdollar et al. | |
| 2020/0369171 | A1* | 11/2020 | Schweitzer | B60L 58/13 |
| 2021/0129701 | A1* | 5/2021 | Brombach | H02J 7/02 |
| 2021/0159548 | A1* | 5/2021 | Deng | H02J 7/342 |
| 2021/0226267 | A1* | 7/2021 | Books | B60L 53/62 |
| 2021/0370793 | A1* | 12/2021 | Tombelli | B60L 53/66 |
| 2021/0376620 | A1* | 12/2021 | Fan | H01M 10/4257 |
| 2022/0026503 | A1* | 1/2022 | Friese | H02J 7/0031 |
| 2022/0085631 | A1* | 3/2022 | Shum | H02J 7/0013 |
| 2022/0123581 | A1* | 4/2022 | Clarke | H01M 10/623 |
| 2022/0153163 | A1* | 5/2022 | Murai | H02J 3/14 |
| 2022/0410755 | A1* | 12/2022 | Pathipati | B60L 53/62 |

FOREIGN PATENT DOCUMENTS

| | | |
|---|---|---|
| JP | 2013090571 A | 5/2013 |
| JP | 2015507914 A | 3/2015 |
| KR | 20130119810 A | 11/2013 |
| KR | 20140011255 A | 1/2014 |
| KR | 101729483 B1 | 4/2017 |
| WO | 2013100764 A | 7/2013 |
| WO | 2020086973 A | 4/2020 |

OTHER PUBLICATIONS

DE102019117613_Translation,Jordan.Vehicle Charger With Several Outputs and Control Strategy,2020.*
International Search Report and Written Opinion dated Oct. 21, 2022 for International Application No. PCT/US2022/034187.
Japanese Notice of Reasons for Rejection Office Action dated Dec. 3, 2024 for Japanese Application No. JP 2023-576153.
European Extended Search Report dated May 12, 2025 for European Application No. 22829089.6.
Japanese Office Action dated Jun. 3, 2025 for Japanese Application No. 2023-576153.

* cited by examiner

FLEET CHARGING STATION ARCHITECTURE

BACKGROUND

An electric vehicle may require regular charging to maintain a battery level sufficient for desired journeys to take place. In the case of autonomous electric vehicles, an autonomous electric vehicle may monitor its own battery state of charge, and may navigate to a charging station in the event that charging of the battery is required. Where an operator maintains a fleet of autonomous electric vehicles, a charging system, including many charging stations, may be provided.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
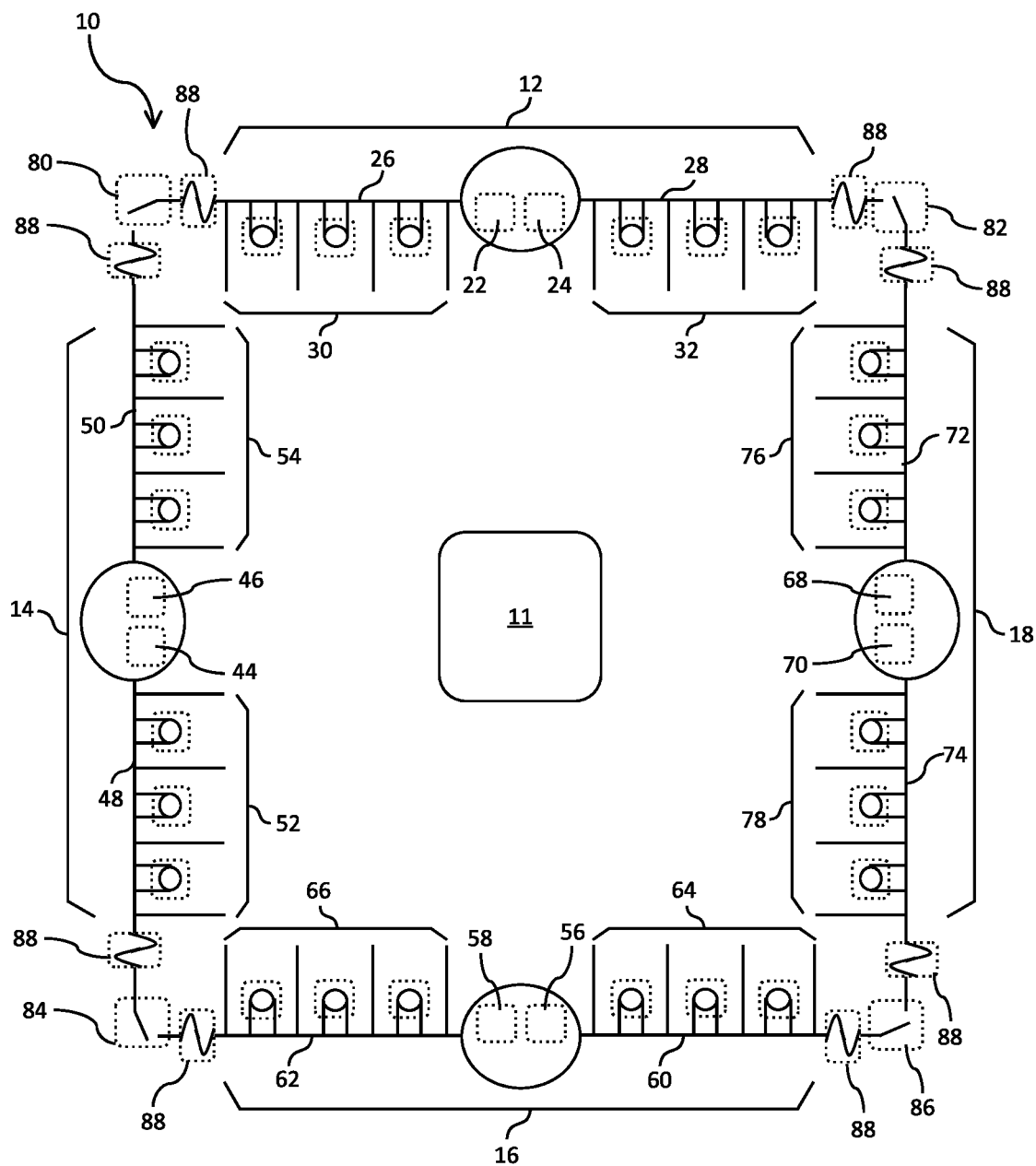
FIG. 1 is a schematic illustration of a charging system including a number of charging stations.

This application relates to efficient and cost-effective charging for a fleet of autonomous electric vehicles, for example a fleet of autonomous electric vehicles that are used as taxis. Where a fleet of autonomous electric vehicles is used to provide taxi services, it may be desirable for the autonomous electric vehicles to be available for journeys as often as possible, particularly during hours of peak demand.

To this end, a charging system is provided that has a number of charging stations. Each charging station has a power converter that is connected to multiple outputs, such that the power converter may be used to charge autonomous electric vehicles connected to each of the outputs simultaneously. This may provide flexibility in charging, for example by allowing the full electrical power provided by the power converter to be provided to a single output to charge a single autonomous electric vehicle, or by splitting the electrical power provided by the power converter to multiple outputs simultaneously to enable simultaneous charging of multiple autonomous electric vehicles. This may enable both rapid and slow charging depending on current requirements. This may be of utility for a fleet of autonomous electric vehicles, for example allowing for rapid or slow charging depending on the time of day at which charging is to occur. In some examples each charging station has a number of power converters, with each power converter connected to multiple outputs, such that each power converter may be used to charge multiple autonomous electric vehicles simultaneously.

Intelligent charging control may be provided such that batteries of autonomous electric vehicles can be charged in an appropriate manner depending on, for example, the state of charge of the battery or the time of day at which charging is to take place. Where two autonomous electric vehicles are to be connected to outputs of the same power converter, connection of the autonomous electric vehicles to the outputs may be determined based on parameters indicative of the state of the two batteries of the electric vehicles. As an example, an electric vehicle having a higher open-circuit voltage may be disconnected from an output to allow charging of an autonomous electric vehicle having a lower open-circuit voltage to take place at another output, which may inhibit charge leakage between the two batteries that would otherwise occur if batteries having different open-circuit voltages were connected to two outputs of the same power converter simultaneously. Where autonomous electric vehicles to be charged have roughly the same level of open-circuit voltage, they may be connected to two different outputs of the same power converter and charged simultaneously.

In the event of adverse operating condition of one of the charging stations of the charging station, outputs of the charging station for connection to electric vehicles can be connected to a power converter of another, different, charging station of the charging station, for example via the closing of appropriate contactors. This may enable charging of the same number of electric vehicles to take place at the charging station, in spite of adverse operating condition of one of the charging stations. A faulted charging station can be disconnected from electric vehicles in this fashion or be supplemented by other charging stations.

Accordingly, a method, charging station, and a charging system may be provided as discussed herein. For example, a method may comprise: connecting a first electric vehicle to a first output of a charging station, the charging station comprising a power converter configured to convert a received first type of electrical power to a second type of electrical power electrical power different to the first type of electrical power, the second type of power comprising DC electrical power, the power converter connected to the first output such that DC electrical power is providable to the first output; charging the first electric vehicle using DC electrical power provided from the power converter to the first output; comparing a first parameter indicative of a current state of a first battery of the first autonomous electric vehicle to a second parameter indicative of a current state of a second battery of a second electric vehicle to be connected to a second output of the charging station, the power converter connected to the second output such that DC electrical power is providable to the second output; i) where the first parameter is greater than the second parameter: disconnecting the first electric vehicle from the first output and connecting the second electric vehicle to the second output; charging the second electric vehicle using DC electrical power provided from the power converter to the second output; where the second parameter reaches a level within a first pre-determined threshold of the first parameter, reconnecting the first electric vehicle to the first output; and simultaneously charging the first electric vehicle and the second electric vehicle using DC electrical power provided from the power converter to the respective first and second outputs; and ii) where the first parameter is less than the second parameter: waiting for the first parameter to reach a level within a second pre-determined threshold of the second parameter; connecting the second electric vehicle to the second output; and simultaneously charging the first electric vehicle and the second electric vehicle using DC electrical power supplied from the power converter to the respective first and second outputs. In such a manner first and second electric vehicles may be simultaneously charged by the same power converter, which may reduce the number of power converters, and hence the cost, required to charge the first and second electric vehicles compared to an arrangement where each power converter can only supply power to one output at a time. By disconnecting the first electric vehicle from the first output and connecting the second electric vehicle to the second output where the first parameter indicative of a current state of a first battery of the first electric vehicle is greater than the second parameter indicative of a current state of the second battery of the second electric vehicle, charge leakage between the batteries of the first and second electric vehicles may be avoided. Similarly, by waiting to connect the second electric vehicle until the first parameter indicative of the current state of the first battery of the first electric vehicle reaches a level within the second pre-determined threshold of the second parameter indicative of a current state of the second battery of the second electric vehicle, charge leakage between the batteries of the first and second electric vehicles may be avoided. In some examples, the first and second parameters may be indicative of respective open-circuit voltages of the first and second batteries.

The power converter may comprise a first power converter, and the method may comprise: connecting a second power converter of the charging station to the second output, the second power converter connected to the second output such that DC electrical power is providable to the second output; and charging the second electric vehicle using DC electrical power provided from the first power converter to the second output and from the second power converter to the second output when the second electric vehicle is connected to the second output and the first electric vehicle is disconnected from the first output. This may enable both the first power converter and the second power converter to provide DC electrical power to charge the second autonomous electric vehicle, which may increase the rate of charging compared to use of a single power converter alone. This may bring the second parameter, for example the open-circuit voltage of the second battery of the second electric vehicle, to roughly the level of the first parameter, for example the open-circuit voltage of the first battery of the first electric vehicle, at a greater speed, which may ensure that the first electric vehicle is not disconnected from the first output for an extended period of time. This may be of particular relevance where the first and second electric vehicles are intended for use as taxis, as it may ensure that both the first and second electric vehicles return to service as soon as is possible, without either having to wait for the other to fully charge.

The charging station may comprise a first charging station, the power converter may comprise a first power converter, and the method may comprise connecting the first and second outputs to a second power converter of a second charging station such that DC electrical power is providable from the second power converter to the first and second outputs of the first charging station, and charging the first and second electric vehicles using DC electrical power provided from the second power converter to the respective first and second outputs. This may provide redundancy in the event of adverse operating condition of the first charging station, and may ensure that the same number of electric vehicles can be charged at the charging station at which the charging station is located.

As another example, a charging station may comprise an input configured to receive a first type of electrical power; a power converter connected to the input, the power converter configured to convert the first type of electrical power from the input to a second type of electrical power different to the first type of electrical power, the second type of electrical power comprising DC electrical power; and outputs connected to the power converter, the outputs configured such that DC electrical power is providable to each of the outputs simultaneously, each of the outputs configured to connect to a respective electric vehicle for charging of the electric vehicle. This may allow a plurality of electric vehicles, for example autonomous electric vehicles, to be charged simultaneously by the same power converter, which may reduce the number of power converters, and hence the cost, required to charge a plurality of electric vehicles compared to an arrangement where each power converter can only supply power to one output, and hence to one electric vehicle, at a time. In some examples, DC electrical power provided to multiple outputs at a same level simultaneously such that each of the outputs has a same charging potential (e.g., a same voltage) to reduce system cost, component count, and improve reliability. In some examples, a vehicle contactor can be used to disconnect or connect a vehicle from a respective output for charge balancing, as will be further disclosed herein.

The power converter may comprise a first power converter, the outputs may comprise first outputs, and the charging station may comprise a second power converter connected to the input, the second power converter configured to convert the first type of electrical power from the input to a third type of electrical power different to the first type of electrical power, the third type of electrical power comprising DC electrical power; and second outputs connected to the second power converter, the second outputs configured such that DC electrical power is providable to each of the second outputs simultaneously, each of the second outputs configured to connect to a respective electric vehicle for charging of the electric vehicle. The first power converter and the second power converter may be connectable such that DC electrical power is providable from the first power converter and the second power converter to the second outputs, and such that DC electrical power is providable from the second power converter and the first power converter to the first outputs. This may allow increased DC electrical power to be supplied to any of the first outputs or second outputs, which may, for example, allow for an increased charging rate if required.

As another example, a charging system may comprise a plurality of charging stations, each charging station comprising an input configured to receive a first type of electrical power; a power converter connected to the input, the power converter configured to convert the first type of electrical power from the input to a second type of electrical power different to the first type of electrical power, the second type of electrical power comprising DC electrical power; and outputs connected to the power converter, the outputs configured such that DC electrical power is providable to each of the outputs simultaneously, each of the outputs configured to connect to a respective electric vehicle for charging of the electric vehicle. This may reduce the number of charging stations and/or power converters required for the charging system compared to, for example, a charging system having charging stations where each power converter can only supply a single electric vehicle at a time, and/or may reduce wait times for charging of an electric vehicle compared to a charging system having a same number of power converters but where each power converter can only supply a single electric vehicle at a time.

A charging system, in the form of a charging depot, generally designated 10, is illustrated schematically in FIG. 1. The charging system 10, as illustrated, comprises a system controller 11, and first 12, second 14, third 16 and fourth 18 charging stations. The charging stations 12,14,16,18 can have substantially the same structure.

The system controller 11 can be configured to perform functions of the charging system 10 including causing connection and disconnection of electric vehicles from the charging stations 12,14,16,18, as will be described hereafter. The controller 11 can comprise an appropriate processor to perform the functionality described herein. The controller 11 can include appropriate communications circuitry to enable the controller 11 to communicate with any of the charging stations 12,14,16,18 and any electric vehicles to be connected to the charging stations 12,14,16,18.

In some examples the system controller 11 can be used to direct autonomous electric vehicles to an appropriate one of the charging stations 12,14,16,18. For example, the system controller 11 may direct an electric vehicle to an appropriate one of the charging stations 12,14,16,18 dependent on a state of a battery of the electric vehicle, and/or may group together electric vehicles for charging at an appropriate one of the charging stations 12,14,16,18 dependent on a state of batteries of the electric vehicles in question. In some examples the controller 11 can direct an electric vehicle to an appropriate charging station 12,14,16,18 based on any of an open-circuit voltage of a battery of an electric vehicle to be connected to a charging station 12,14,16,18, an open-circuit voltage of a battery of an electric vehicle already connected to a charging station 12,14,16,18, a state of charge of a battery of an electric vehicle to be connected to a charging station 12,14,16,18, and a state of charge of a battery of an electric vehicle already connected to a charging station 12,14,16,18. As used herein, open-circuit voltage can refer to a resting vehicle at a charging wherein substantially few components (e.g., the drivetrain) of a vehicle are drawing power from a vehicle battery. Components of a vehicle may be drawing power during open-circuitry voltage for self-test, ventilation, fluid pumps, etc. A high mismatch of open-circuit voltage can lead to cross currents between vehicles and may be detrimental to vehicle batteries and/or a charging station. Additionally, it may lead to unbalanced charging between vehicles especially if the corresponding charging station output coupled to the vehicles share a common power stage (e.g., share regulation of power between them).

For example, where an incoming electric vehicle has a battery with an open-circuit voltage substantially corresponding to an open-circuit voltage of a battery of an electric vehicle already being charged at one of the charging stations 12,14,16,18, the system controller 11 can direct the incoming electric vehicle to the charging station 12,14,16,18 to that charging station 12,14,16,18. Additionally or alternatively, where a state of charge of an incoming electric vehicle is such that the incoming electric vehicle requires rapid charging, for example to meet desired turn-around times or during peak operating hours, the system controller 11 can direct the incoming vehicle to an unoccupied charging station 12,14,16,18 such that rapid charging can occur, as will be described hereinafter. In these, and other examples, the system controller 11 can incoming direct electric vehicles to appropriate charging stations 12,14,16, 18 depending on the state of the battery of the incoming electric vehicles, along with other parameters such as the time of day, and the status of other electric vehicles in a fleet to which the incoming electric vehicles belong.

In some examples the system controller 11 can communicate with electric vehicles and/or charging stations 12,14, 16,18 to start and/or stop charging of the electric vehicles, as will be discussed in more detail hereinafter. Controller 11 may be a site controller communicatively coupled to multiple charging stations and/or vehicles and/or may coordinate with corresponding controllers of charging stations which functionality, disclosed herein, shared therebetween in any combination.

In some examples the system controller 11 may monitor and/or receive safety information pertaining to electric vehicles and/or any of the charging stations 12,14,16,18, and cause appropriate action to be taken, for example by disconnecting vehicles from a charging station 12,14,16,18.

Figure 2:
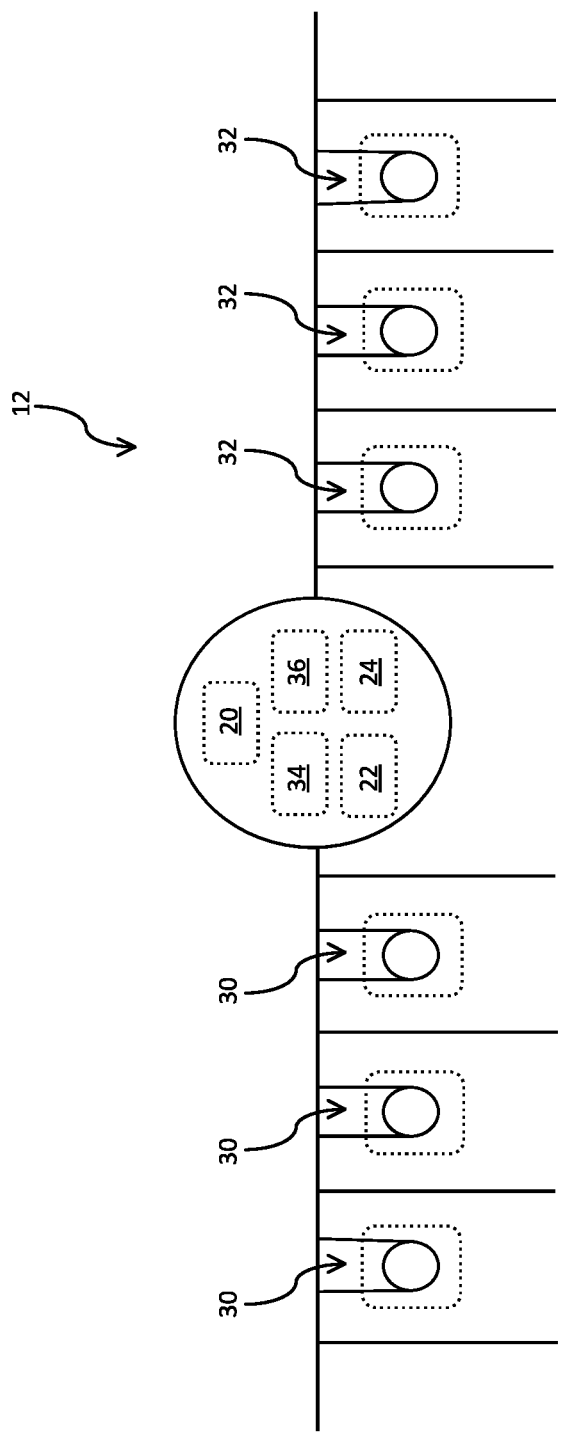
FIG. 2 is a schematic illustration of a charging station.

The first charging station 12, illustrated in isolation in FIG. 2, comprises an input 20, a first power converter 22, a second power converter 24, a first link 26, a second link 28, a first plurality of outputs 30, a second plurality of outputs 32, a communication module 34 and a controller 36.

The input 20 can be an electrical connection connecting the first charging station 12 to a mains electrical power supply, such that the input 20 receives AC electrical power from a mains electrical power supply. Mains electrical power can be in the range of 100-240V AC at 50 to 60 Hz frequency, for example, or can alternatively be a 480V three-phase power supply. In other examples, the input can be an electrical connection connecting the first charging station to an appropriate DC electrical power supply. It will be appreciated that AC electrical power can be a first type of electrical power, and that DC electrical power can be a second type of electrical power. It will further be appreciated that electrical powers at different voltages, or different power levels, can further be considered as different types of electrical power.

Figure 3:
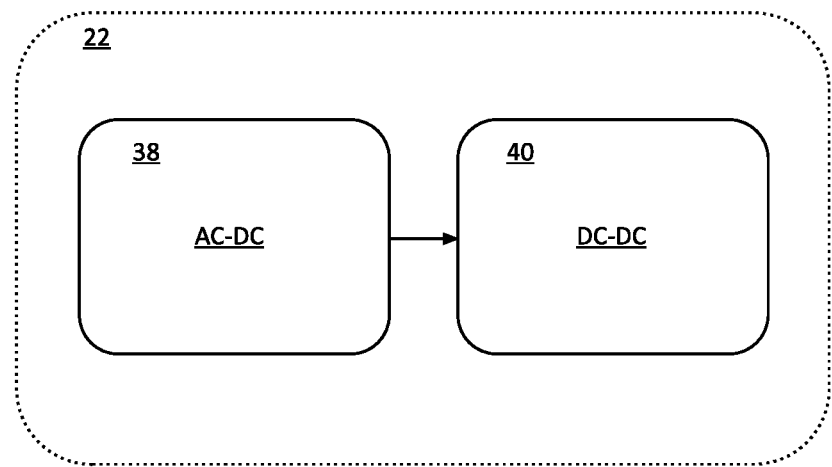
FIG. 3 is a schematic illustration of a power converter.

The first power converter 22, in the example of FIG. 2, can convert AC electrical power received at the input 20 to DC electrical power suitable for charging an electric vehicle. An example illustrating a possible schematic layout of the first power converter 22 is shown in FIG. 3. The first power converter 22 can comprise an AC-DC stage 38 and a DC-DC stage 40. The AC-DC stage 38 can comprise power electronics suitable for converting AC electrical power received at the input 20 to DC electrical power and, in some examples, comprises a rectifier or the like. The DC-DC stage 40 can take the DC electrical power from the AC-DC stage 38 and step down the voltage to a voltage appropriate for charging an electric vehicle. The DC-DC stage 40 can comprise power electronics to perform the step-down function and may comprise an appropriate step-down or buck converter. Although not illustrated in FIG. 3, in some examples the first power converter 22 can comprise a power factor correction (PFC) stage before the AC-DC stage 38, or as part of the AC-DC stage 38, to reduce losses.

In other examples, the first power converter 22 can convert a first voltage of DC electrical power received at the input 20 to a second, lower, voltage of DC electrical power suitable for charging an electric vehicle. In such examples, the AC-DC stage 38, and any appropriate PFC stage, can be omitted.

As an illustrative example, the first power converter 22 may be designed such that the first power converter 22 is capable of outputting DC electrical power at a power of around 85 kW. Whilst 85 kW is used here as an illustrative example, it will be appreciated that the power provided by the first power converter 22 may vary in practice, with the maximum power typically being dependent on the available input power, the condition of the battery of the autonomous electric vehicle that the first charging station 12 is designed to optimally charge, and/or electrical interconnects and power handling capabilities of components therebetween.

The second power converter 24 can convert AC electrical power received at the input 20 to DC electrical power suitable for charging an electric vehicle. The second power converter 24 may have substantially the same form as the first power converter 22. In particular, the second power converter 24 can comprise an AC-DC stage and a DC-DC stage. The AC-DC stage can comprise power electronics suitable for converting AC electrical power received at the input 20 to DC electrical power and, in some examples, can comprise a rectifier or the like. The DC-DC stage can take the DC electrical power from the AC-DC stage and step down the voltage to a voltage appropriate for charging an electric vehicle. The DC-DC stage can comprise power electronics to perform the step-down function and may comprise an appropriate step-down or buck converter. In some examples the second power converter 24 can comprise a power factor correction (PFC) stage before the AC-DC stage, or as part of the AC-DC stage, to reduce losses.

In other examples, the second power converter 24 can convert a first voltage of DC electrical power received at the input 20 to a second, lower, voltage of DC electrical power suitable for charging an electric vehicle. In such examples, the AC-DC stage 38, and any appropriate PFC stage, can be omitted.

As an illustrative example, the second power converter 24 may be designed such that the second power converter 24 is capable of outputting DC electrical power at a power of around 85 kW. Whilst 85 kW is used here as an illustrative example, it will be appreciated that the power provided by the second power converter 24 may vary in practice, with the maximum power typically being dependent on the available input power, the condition of the battery of the autonomous electric vehicle that the first charging station 12 is designed to optimally charge, and/or electrical interconnects and power handling capabilities of components therebetween.

Figure 4:
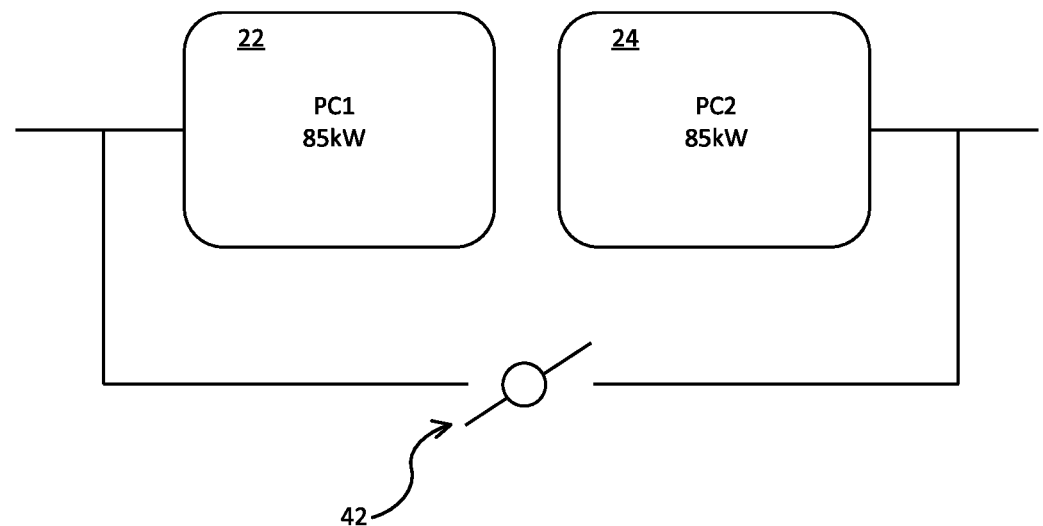
FIG. 4 is a schematic illustration of two connectable power converters.

As illustrated schematically in FIG. 4, the first 22 and second 24 power converters can be connectable, in parallel, via a disconnect switch 42. This may allow the power of each of the first 22 and second 24 power converters to be supplied to any of the first 30 and second 32 pluralities of outputs, which may allow for selective fast charging of an electric vehicle connected to any of the first 30 and second 32 pluralities of outputs, as will be discussed in more detail hereafter. Following the illustrative example mentioned above, where each of the first 22 and second 24 power converters can have a power output of 85 kW, the first charging station 12 may be capable of providing a power output of 170 kW at any of the outputs of the first 30 and second 32 pluralities of outputs.

The first 26 and second 28 links can each comprise a DC bus extending from the respective first 22 and second 24 power converters. Each output of the first plurality of outputs 30 can comprise a connector coupled to the first link 26, with the connector being any appropriate connector for connecting to a charge terminal of an electric vehicle. Similarly, each output of the second plurality of outputs 32 can comprise a connector coupled to the second link 28, with the connector being any appropriate connector for connecting to a charge terminal of an electric vehicle. As illustrated in FIGS. 1 and 2, the first plurality of outputs 30 can comprise three outputs, and the second plurality of outputs 32 can comprise six outputs. This means that the first charging station 12 can be connected to up to six autonomous electric vehicles at a time, enabling charging of up to six autonomous electric vehicles at a time.

Whilst illustrated in FIGS. 1 and 2 with six outputs, it will be appreciated that the first charging station 12 may comprise differing numbers of outputs, with the number of outputs chosen to give a balance between charge rate and number of vehicles able to be charged simultaneously. For example, and as will be discussed in more detail hereinafter, where the first power converter 22 can be capable of providing 85 kW of output power, and the first power converter 22 can provide DC electrical power to three electric vehicles simultaneously, each electric vehicle can be provided with a power of around 28 kW (subject to losses, which may be determined by the efficiency of the first power converter 22). An arrangement with a greater number of outputs may allow more electric vehicles to be charged simultaneously, but with additional electric vehicles resulting in the total power provided to each electric vehicle simultaneously being lower. A lower total power provided to an electric vehicle may increase the time taken to charge the electric vehicle.

There may therefore be a balance to be reached in terms of number of autonomous electric vehicles capable of being charged simultaneously by a single power converter versus the overall charge time when charging a number of electric vehicles simultaneously using a single power converter. The example of FIGS. 1 and 2, in which the first charging station 12 has three outputs 30,32 per power converter 22,24 may provide a good balance between number of electric vehicles capable of being charge simultaneously by a single power converter versus the overall charge time when charging a number of electric vehicles simultaneously using a single power converter.

The communication module 34 can comprise transmitters, receivers, and/or transceivers, to enable the first charging station 12 to communicate with autonomous electric vehicles coupled, or to be coupled, to the first 30 and second 32 pluralities of outputs, and to enable the first charging station 12 to communication with the system controller 11. Details of the communication module 34 are not described here for the sake of brevity, save to say that the communication module 34 is capable of sending and/or receiving signals indicative of any of autonomous electric vehicle state of charge, autonomous electric vehicle health, autonomous electric vehicle contactor control, and power converter health. The signals mentioned here are illustrative examples only, and it will be appreciated that other types of signal may be sent and/or received by the communication module 34.

The controller 36 can be configured to perform functions of the first charging station 12 including causing connection and disconnection of autonomous electric vehicles from the first 30 and second 32 pluralities of outputs, as will be described hereafter. The controller 36 can comprise an appropriate processor to perform the functionality described herein. In some examples the controller 36 can communicate with the system controller 11, and the controller 36 can be guided by the system controller 11 to perform such functions. In such examples, the system controller 11 can act as a master controller, and the controller 36 can act as a slave controller. It will be appreciated that in some examples the communication module 34 and the controller 36 can be embodied as a single control module.

Collectively, the input 20, the first power converter 22, the second power converter 24, the communication module 34 and the controller 36 may be disposed in a housing, with the housing and associated internal components referred to as a charger.

Examples of operation of the first charging station 12 to charge one or more autonomous electric vehicles will be described with reference to FIGS. 5 to 9.

Figure 5:
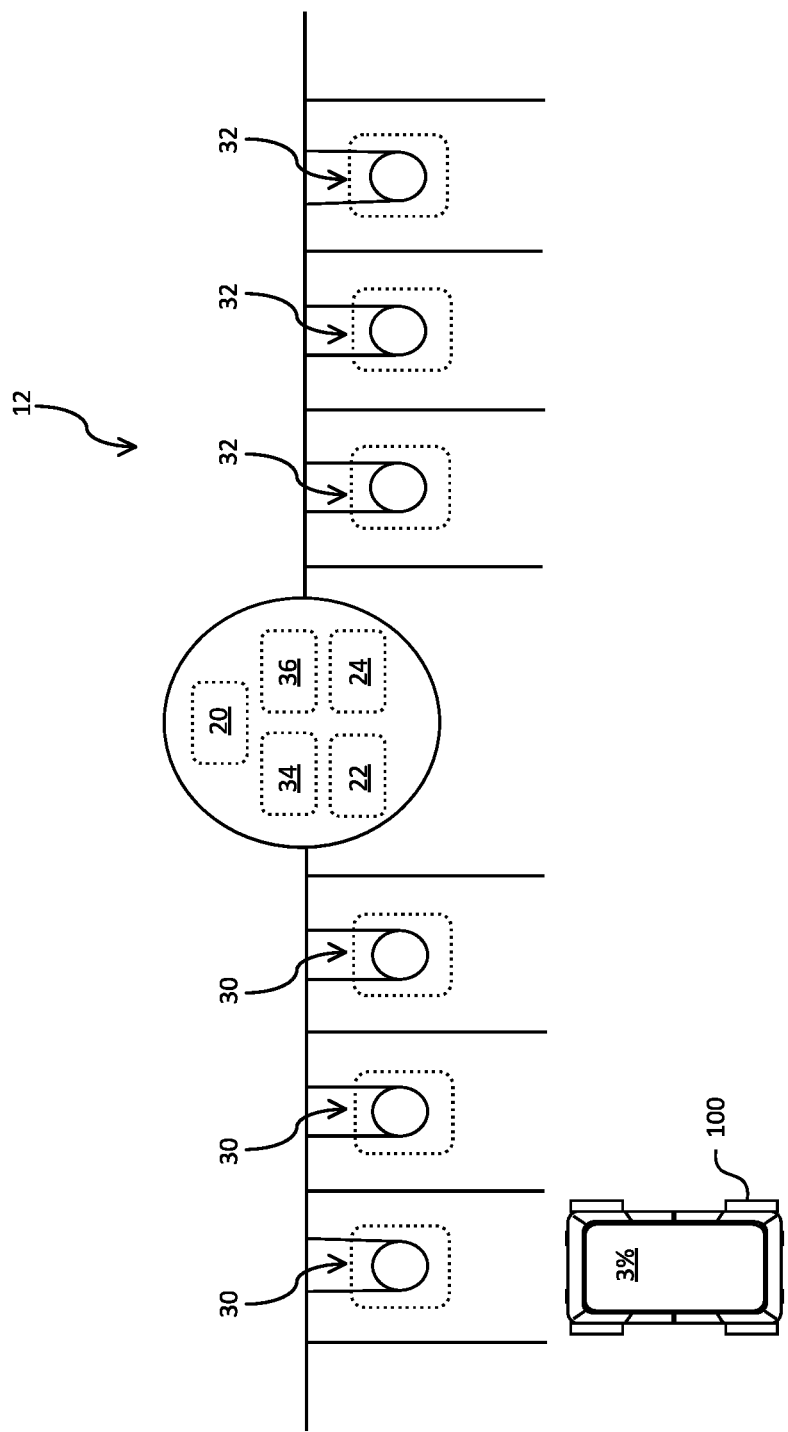
FIG. 5 is a schematic illustration of a first use case of a charging station.

In the example of FIG. 5, a first electric vehicle 100 has approached the first charging station 12, with the first electric vehicle 100 having a state of charge of 3%. The first electric vehicle 100 can establish communications with the system controller 11, and with the communication module 34 of the first charging station 12, for example via the system controller 11. Provided communications between the first electric vehicle 100 and the system controller 11 and/or first charging station 12 are established, the system controller 11 can communicate with the controller 36 can communicate and with a controller of the electric vehicle 100, to perform system safety checks of both the first charging station 12 and the electric vehicle 100. Provided the safety checks do not identify any potential issues, the system controller 11 can cause the controller 36 of the first charging station 12 to pre-charge the first link 26 using the first power converter 22. Either the system controller 11, or the controller 36, can then cause, via a signal sent to the corresponding controller of the electric vehicle 100 indicting that the first link 26 has been pre-charged, connection of the electric vehicle 100 to an output of the first plurality of outputs 30 to enable charging of the electric vehicle, with the electric vehicle 100 closing charge contactors to enable charging to take place.

By default, the first power converter 22 can be used to provide DC electrical power to the first plurality of outputs 30 to charge the electric vehicle 100. Given that only the single electric vehicle 100 is connected to any of the first plurality of outputs 30 in this example, power is provided at around 85 kW (subject to losses) to charge the electric vehicle 100. Defaulting to use of the first power converter 22 alone to charge the electric vehicle may provide relatively less power for charging of a battery of the electric vehicle 100, which may prolong battery life compared to defaulting to higher power charging using multiple power converters.

However, as there are no electric vehicles connected to the second plurality of outputs 32, the controller 36 of the first charging station 12 can cause connection of the second power converter 24 and the first power converter 22 in parallel, for example in response to a command from the system controller 11, such that 170 kW of electrical power (subject to losses) can be provided to the first plurality of outputs 30 and hence to the electric vehicle 100, if desired.

Example scenarios where this may be desirable include where the state of charge of the electric vehicle 100 is below a pre-determined threshold, and where a high priority charging state is determined. For example, the electric vehicle 100 in FIG. 5 has arrived at the first charging station 12 with a state of charge of 3%. This state of charge can be communicated to any of the system controller 11 and the controller 36 of the first charging station 12 by the electric vehicle 100, and any of the system controller 11 and the controller 36 can determine that this state of charge is below a pre-determined threshold of, for example 20% or 10%. In response, any of the system controller 11 and the controller 36 of the first charging station 12 can cause connection of the second power converter 24 and the first power converter 22 in parallel, such that 170 kW of electrical power (subject to losses) can be provided to charge the autonomous electric vehicle 100 to quickly bring the state of charge to a desired level. Additionally or alternatively, a high priority charging state can be determined dependent on a time of day at which the autonomous electric vehicle 100 is to be charged, or based on a status of a fleet of electric vehicles to which the electric vehicle 100 belongs. For example, where the electric vehicle 100 is used for taxi services, higher levels of demand can occur at different points of the day, and so it can be desirable to charge the electric vehicle 100 at a faster rate at certain times of the day to enable quicker return to service. Similarly, where the remainder of a fleet of electric vehicles to which the autonomous electric vehicle 100 belongs is in use it can be desirable to charge the electric vehicle 100 at a faster rate to enable quicker return to service. Information regarding time of day and/or fleet status may be communicated to any of the system controller 11 and the controller 36 by the electric vehicle 100 or may be derived by any of the system controller 11 and the controller 36 from other sources.

When the electric vehicle 100 has finished charging to a desired level, which may or may not be 100% state of charge depending upon a required journey of the autonomous electric vehicle 100, the electric vehicle 100 can open its fast charge contactors to disconnect from the output of the first plurality of outputs 30, and the electric vehicle may leave the first charging station 12.

Figure 6:
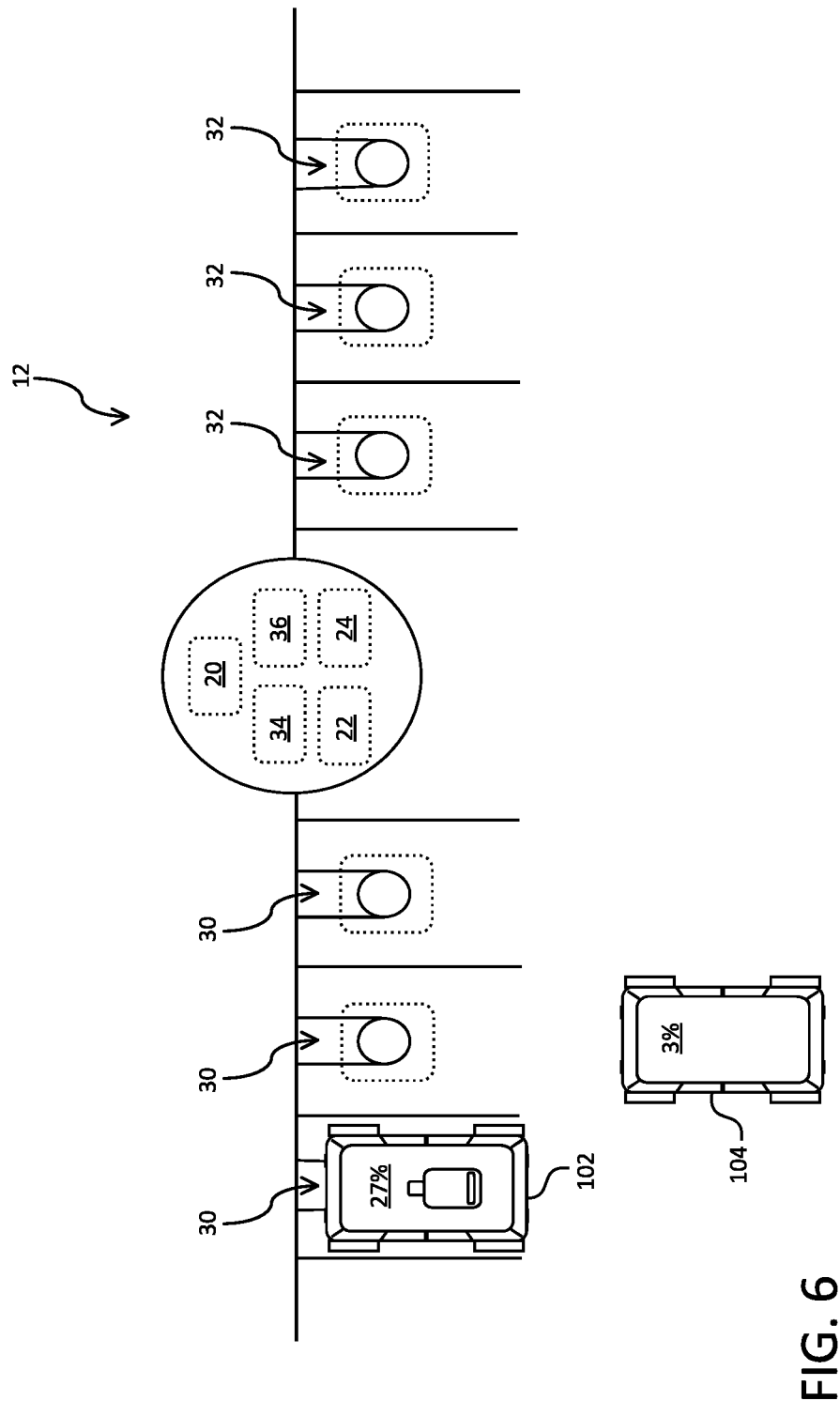
FIG. 6 is a schematic illustration of a second use case of a charging station.

FIG. 6 illustrates a second example of use of the first charging station 12. In the example of FIG. 6, a first electric vehicle 102 is illustrated as already connected to an output of the first plurality of outputs 30 and is charging in the manner described previously in relation to the example of FIG. 5. A second electric vehicle 104 approaches the first charging station 12 and requires connection to a further one of the first plurality of outputs 30, e.g. to the first power converter 22, for charging. As illustrated in FIG. 6, the first electric vehicle 102, which is already connected for charging, has a current state of charge of 27%, whilst the second autonomous electric vehicle 102, which is not yet connected for charging, has a current state of charge of 3%. The state of charge of the first 102 and second 104 electric vehicles can be communicated to any of the system controller 11 and the controller 36 of the first charging station 12. In the example of FIG. 6, a battery of the first electric vehicle 102 can have an open-circuit voltage level that is greater than an open-circuit voltage level of a battery of the second electric vehicle 104, for example greater than the open-circuit voltage level of the battery of the second electric vehicle 104 by 10V or more. The open-circuit voltage level of the first 102 and second 104 electric vehicles can be communicated to any of the system controller 11 and the controller 36 of the first charging station 12. Here each of the state of charge of the battery and the open-circuit voltage level can be considered parameters indicative of a state of the respective batteries.

In some examples, the system controller 11 can have already directed the second 104 autonomous electric vehicle toward the first charging station 12 based on any of its state of charge and the open-circuit voltage level of its battery.

Given that the open-circuit voltage level of the first electric vehicle 102 is greater than the open-circuit voltage level of the second electric vehicle 104 for this example, any of the system controller 11 and the controller 36 can cause disconnection of the first electric vehicle 102 from its respective output of the first plurality of outputs 30, for example by communicating a signal to the corresponding controller of the first electric vehicle 102 requesting that the first electric vehicle 102 disconnects from its respective output of the first plurality of outputs 30. The first electric vehicle 102 can opens its charging contactors to disconnect from its respective output of the first plurality of outputs 30, such that charging of the first electric vehicle 102 ceases.

Once the first autonomous vehicle 102 is disconnected, any of the system controller 11 and the controller 36 causes connection of the second electric vehicle 104 to a further one of the first plurality of outputs 30, for example by communicating a signal to the corresponding controller of the second electric vehicle 104 indicating that connection is possible and/or requesting that the second electric vehicle 104 connects to the further one of the first plurality of outputs 30. The second electric vehicle 104 closes its fast charge contactors to connect to the further one of the first plurality of outputs 30, such that charging of the second autonomous electric vehicle 104 begins.

The open-circuit voltage level of the second electric vehicle 104 can be communicated to any of the system controller 11 and the controller 36 of the first charging station 12 during charging, as can the state of charge of the second electric vehicle 104. When the open-circuit voltage level of the second electric vehicle 104 is within a predetermined threshold of the current open-circuit voltage level of the first autonomous electric vehicle 102, the first autonomous electric vehicle 102 can be reconnected, with connection taking place in the manner previously described, to its respective output of the first plurality of outputs 30, to resume charging. In some examples the pre-determined threshold may be within 10 volts, or within 5 volts of the current open-circuit voltage level of the first electric vehicle 102. The first 102 and second 104 electric vehicles can then charge together, simultaneously, in parallel, with the electrical power of the first link 26 split between the first 102 and second 104 electric vehicles. By only charging electric vehicles having similar open-circuit voltage levels, connected to a common link from the same power converter, charge leakage may be avoided compared to a scenario where electric vehicles having greatly differing voltage levels are charged simultaneously via a common link from the same power converter.

In some examples the state of charge of the electric vehicles can be used in addition to, or as an indicator of, the open-circuit voltage levels. For example, where the state of charge of the second electric vehicle 104 reaches a level within a pre-determined threshold of say 2% of the state of charge of the first electric vehicle 102, the open-circuit voltage levels can be approximated as roughly equal, and appropriate charging of the first 102 and second 104 electric vehicles in parallel can take place. Considering the example of FIG. 6, the first electric vehicle 102 can have a state of charge of 27%, and the second electric vehicle 104 can have a state of charge of 3%. This can be a good indication that the batteries of the first 102 and second 104 electric vehicles have different open-circuit voltages. Where the state of charge of the second 104 electric vehicle close to the state of charge of the first electric vehicle 102, this can be a good indication that the batteries of the first 102 and second 104 electric vehicles have similar open-circuit voltage levels. By bringing the state of charge of the second 104 electric vehicle close to the state of charge of the first electric vehicle 102, the open-circuit voltage level of the battery of the second electric vehicle 104 can be brought close to the open-circuit voltage level of the battery of the first electric vehicle 102 such that appropriate charging of the first 102 and second 104 electric vehicles in parallel can occur. The state of charge can be usefully for estimating an open-circuit voltage level wherein, for example, the open-circuit voltage level may not be able to be directly measured because there is a load on the battery. The state of charge can be used to estimate the open-circuit voltage in such instances by characterizing the load, environmental factors (e.g., temperature), battery factors (e.g., age, configuration, battery cell composition, etc.).

As mentioned above, the second electric vehicle 104 can initially, when it approaches the first charging station 12, have a state of charge of 3%, and an open-circuit voltage level lower than an open-circuit voltage level of the first electric vehicle 102. Where there are no electric vehicles connected to any of the second plurality of outputs 32, any of the system controller 11 and the controller 36 can cause connection of the first 22 and second 24 power converters such that each of the first 22 and second 24 power converters supplies DC electrical power to the first link 26. This may allow the second electric vehicle 104 to be charged at a faster rate to bring any of the open-circuit voltage level and the state of charge of the second autonomous electric vehicle 104 to the open-circuit voltage level and state of charge of the first autonomous electric vehicle 102 more quickly. This may enable the first electric vehicle 102 to return to being charged sooner than if the second electric vehicle 104 is initially charged using the first power converter 22 alone.

In some examples, the first 102 and second 104 electric vehicles may be simultaneously charged, where they have any of substantially the same open-circuit voltage level and substantially the same state of charge, using the first power converter 22 alone, for example. In the illustrative example mentioned previously, this may result in 85 kW of electrical power (subject to losses) being split to charge the first 102 and second 104 electric vehicles. In some examples, where desired, the first 102 and second 104 electric vehicles may be simultaneously charged, where they have any of substantially the same open-circuit voltage level and substantially the same state of charge, using the first power converter 22 and the second power converter 24. Such scenarios may occur where a high priority charging state is identified, as previously described. In the illustrative example mentioned previously, this may result in 170 kW of electrical power (subject to losses) being split to charge the first 102 and second 104 electric vehicles, which may increase a charging rate of the first 102 and second 104 electric vehicles.

In the example of FIG. 6, the first electric vehicle 102 initially has a higher state of charge (27%) than the second electric vehicle 104 (3%), and the first electric vehicle 102 initially has a higher open-circuit voltage than the second electric vehicle 104. If, instead, the second electric vehicle 104, i.e. the autonomous electric vehicle to be connected to an output of the first plurality of outputs 30, has any of a higher open-circuit voltage and a higher state of charge than the first electric vehicle 104, i.e. the autonomous electric vehicle already connected to an output of the first plurality of outputs 30, then the first electric vehicle 102 remains connected, with the second 104 autonomous electric vehicle only being connected once the open-circuit voltage level or state of charge of the first electric vehicle 104 is approximately equal to the open-circuit voltage level or state of charge of the second electric vehicle 104.

In other examples, disconnection of the first electric vehicle 102 when the second electric vehicle 104 is to be charged by the first charging station 12 can occur irrespective of the state of charge and/or open-circuit voltage of the first electric vehicle 102. For example, in certain scenarios it can be assumed that a vehicle already being charged has a higher state of charge and/or open-circuit voltage than a vehicle to be charged, as vehicles may only need to be charged when their state of charge is below a certain threshold, and so it can be assumed that the already connected vehicle needs to be disconnected without a comparison between the connected vehicle and the vehicle to be connected taking place.

Figure 7:
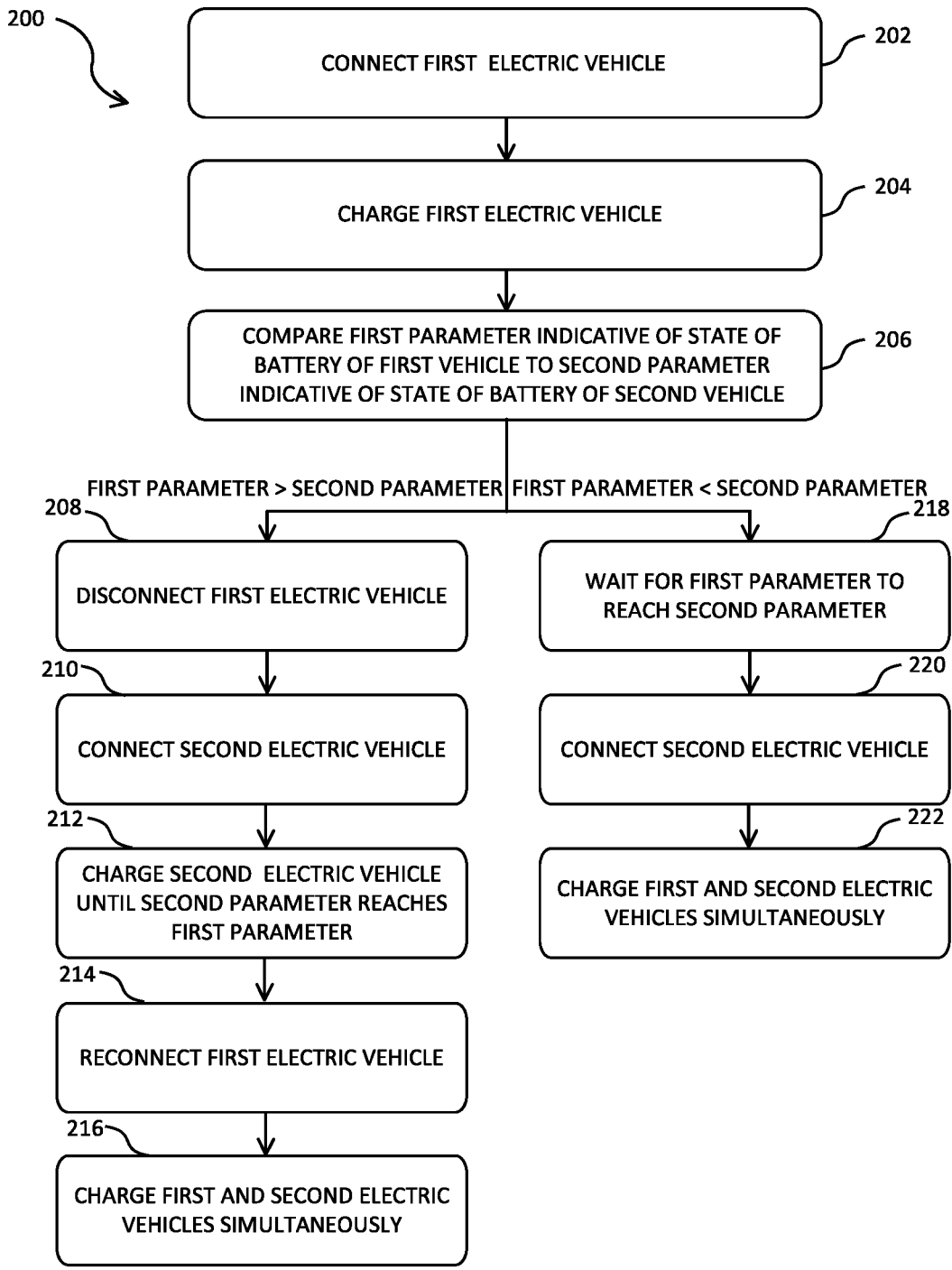
FIG. 7 is a flow diagram illustrating a method of charging first and second autonomous electric vehicles.

A method 200, in which steps described above in relation to the example of FIG. 6 are performed, is illustrated in the flow diagram of FIG. 7.

The method 200 comprises connecting 202 a first electric vehicle to a first output of a charging station, where the charging station comprises a power converter configured to convert a received first type of electrical power to a second type of electrical power comprising DC electrical power, and the power converter is connected to the first output such that DC electrical power is providable to the first output.

The method 200 comprises charging 204 the first electric vehicle using DC electrical power provided from the power converter to the first output.

The method 200 comprises comparing 206 a first parameter indicative of a current state of a first battery of the first autonomous electric vehicle to a second parameter indicative of a current state of a second battery of a second electric vehicle to be connected to a second output of the charging station, where the power converter is connected to the second output such that DC electrical power is providable to the second output.

The method 200 comprises, where the first parameter is greater than the second parameter, disconnecting 208 the first electric vehicle from the first output and connecting 210 the second electric vehicle to the second output.

The method 200 comprises charging 212 the second electric vehicle using DC electrical power provided from the power converter to the second output.

The method 200 comprises, where second parameter reaches a level within a first pre-determined threshold of the first parameter, reconnecting 214 the first electric vehicle to the first output.

The method 200 comprises 216 simultaneously charging the first electric vehicle and the second electric vehicle using DC electrical power supplied from the power converter to the respective first and second outputs.

The method 200 comprises, where the first parameter is less than the second parameter, waiting 218 for the first parameter to reach a level within a second pre-determined threshold of the second parameter, and then connecting 220 the second electric vehicle to the second output. The method 200 comprises simultaneously charging 222 first electric vehicle and the second electric vehicle using DC electrical power supplied from the power converter to the respective first and second outputs.

In such a manner the method may allow for simultaneous charging of first and second electric vehicles using the same power converter, whilst also providing a reduced risk of charge leakage between the two electric vehicles compared to, for example, an arrangement where first and second electric vehicles having any of greatly differing open-circuit voltage levels and states of charge are charged simultaneously using the same power converter.

In some examples, the method 200 comprises connecting a second power converter of the charging station to the second output such that DC electrical power is providable to the second output, and charging the second electric vehicle using DC electrical power provided from the first power converter to the second output and from the second power converter to the second output when the second electric vehicle is connected to the second output and the first electric vehicle is disconnected from the first output. As previously discussed, this may allow for quicker charging of the second electric vehicle compared to using the power converter alone, which may reduce the time that the first electric vehicle has to wait before charging can resume.

Figure 8:
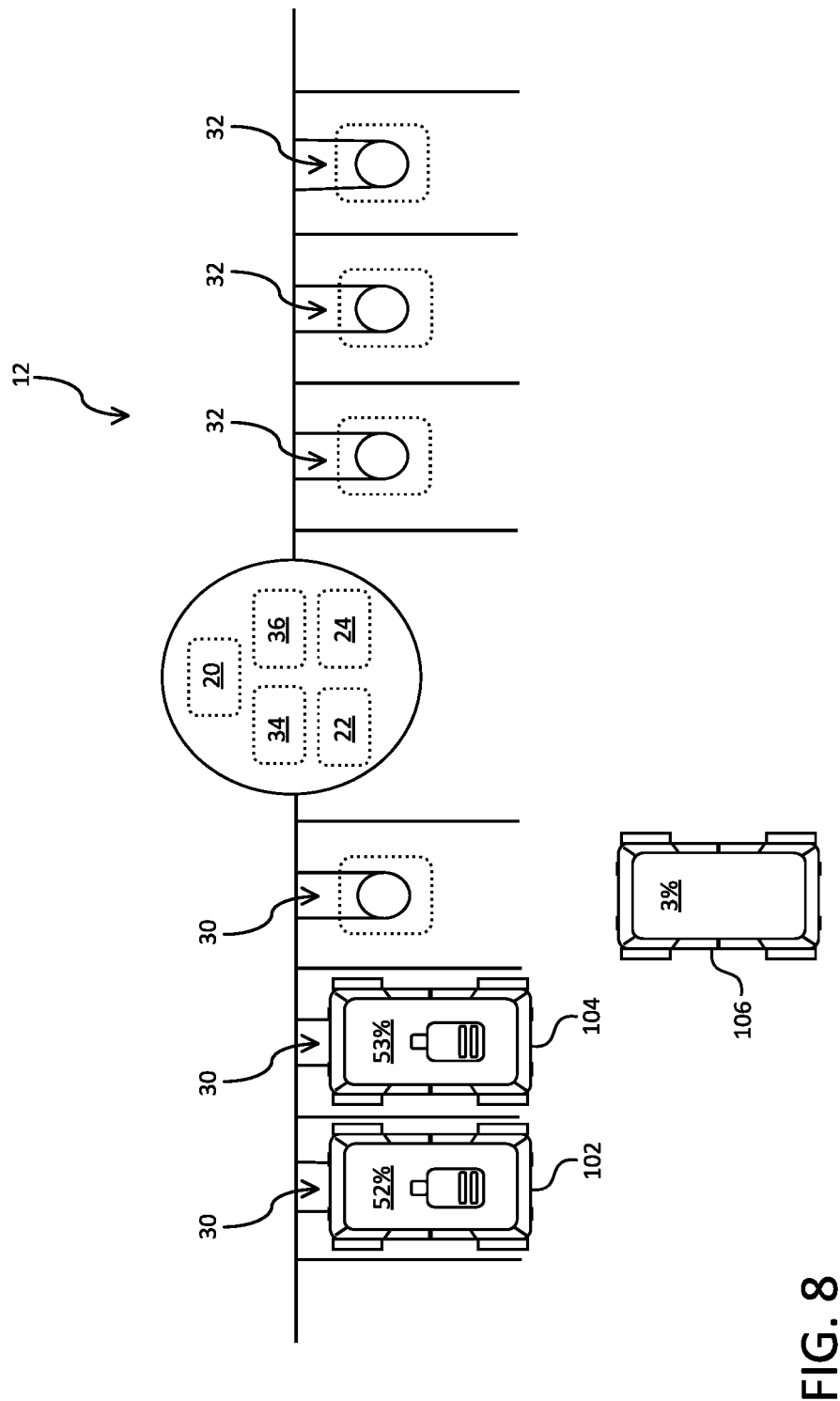
FIG. 8 is a schematic illustration of a third use case of a charging station.

In some examples, as illustrated schematically in FIG. 8, a third electric vehicle 106 can approach the first charging station 12 to be connected to one of the first plurality of outputs 30 whilst the first 102 and second 104 electric vehicles are being charged simultaneously. In a similar manner to that described in relation to the example of FIG. 6, any of the open-circuit voltage level of the battery packs and the state of charge of the first 102, second 104 and third 106 electric vehicles can be taken into account to ensure that the first 102, second 104, and third 106 electric vehicles are charged simultaneously when the first 102, second 104 and third 106 electric vehicles have substantially similar open-circuit voltage levels or states of charge. For example, as illustrated in FIG. 7 the third electric vehicle 106 can have a stage of charge of 3%, whilst the first 102 and second 104 electric vehicles can have states of charge of 52% and 53% respectively. The battery pack of the third electric vehicle 106 can have an open-circuit voltage level lower than the open-circuit voltage levels of the first 102 and second 104 electric vehicles, and the battery packs of the first 102 and second 104 electric vehicles can have substantially similar open-circuit voltage levels. In such an example, the first 102 and second 104 electric vehicles can be disconnected and the third electric vehicle 106 can be connected, with the third electric vehicle 106 charged until its open-circuit voltage level reaches approximately the same level as the open-circuit voltage levels of the first 102 and second 104 electric vehicles, and its state of charge reaches approximately the same level as the states of charge of the first 102 and second 104 autonomous electric vehicles. The first 102 and second 104 electric vehicles can subsequently be reconnected such that each of the first 102, second 103, and third 106 electric vehicles can be charged simultaneously.

Figure 9:
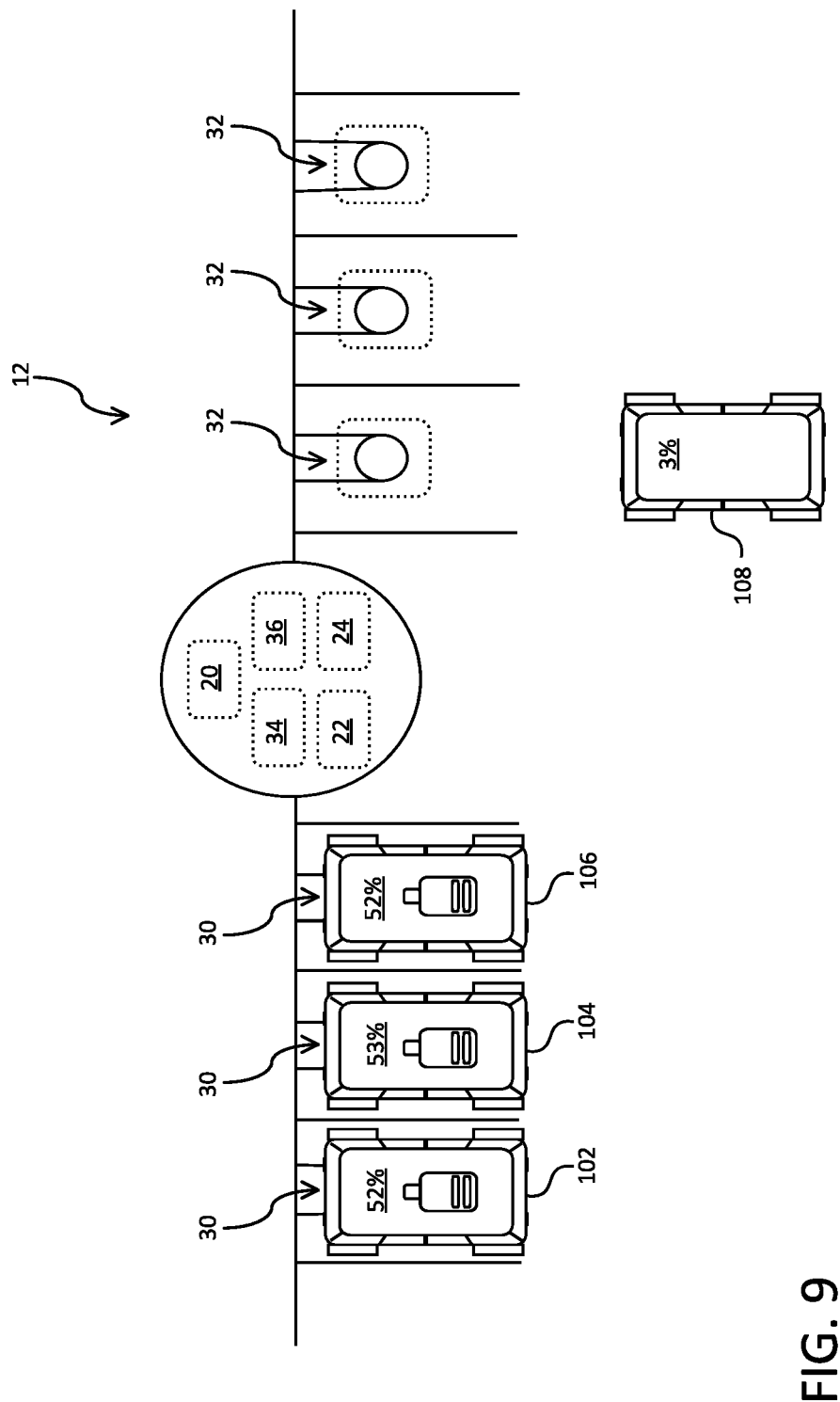
FIG. 9 is a schematic illustration of a fourth use case of a charging station.

A further example of use of the first charging station 12 is illustrated schematically in FIG. 9. Here a fourth 108 electric vehicle can approach the first charging station 12 to be connected to an output of the second plurality of outputs 132 whilst the first 102, second 104 and third 106 electric vehicles are being charged simultaneously. Where the first 102, second 104 and third 106 electric vehicles are being charged simultaneously using only the first power converter 22, the fourth electric vehicle 108 can connect to one of the second plurality of outputs 32, in the manner previously described. If the first 102, second 104 and third 106 electric vehicles are being charged simultaneously using the first power converter 22 and the second power converter 24, any of the system controller 11 and the controller 36 can cause the disconnect switch 42 to open, such that the first power converter 22 can supply DC electrical power to the first plurality of outputs 30, and the second power converter 24 can supply DC electrical power to the second plurality of outputs 32. The fourth electric vehicle 108 can then be connected to an output of the second plurality of outputs 32 and charged in the manner previously described. Although not illustrated, it will be appreciated that fifth and sixth electric vehicles can also be connected to respective ones of the second plurality of outputs 32, in the manner previously described, such that the first charging station 12 is capable of charging six electric vehicles simultaneously, using the first 22 and second 24 power converters to each charge three electric vehicles simultaneously.

The second 14, third 16 and fourth 18 charging stations can respectively each have a similar structure as the first charging station 12, and can operate in the same way as the first charging station 12 described above. This may enable each charging station 12,14,16,18 to simultaneously charge six electric vehicles, which may enable simultaneous charging of 24 vehicles using only 8 power converters (i.e. two per charging station). This may provide a lower cost charging system than, for example, a charging system where each power converter can charge only one autonomous electric vehicle at a time.

Referring back to the example of the charging system 10 of FIG. 1, the second charging station 14 can comprise a first power converter 44, a second power converter 46, a first link 48, a second link 50, a first plurality of outputs 52, and/or a second plurality of outputs 54. The third charging station 16 can comprise a first power converter 56, a second power converter 58, a first link 60, a second link 62, a first plurality of outputs 64, and/or a second plurality of outputs 66. The fourth charging station 18 can comprise a first power converter 68, a second power converter 70, a first link 72, a second link 74, a first plurality of outputs 76, and/or a second plurality of outputs 78. The interaction of components of each of the second 14, third 16 and fourth 18 charging stations within that charging station can be similar as described above in relation to the first charging station 12.

In the example of FIG. 1, the first link 26 of the first charging station 12 can be connected to the second link 50 of the second charging station 14 by a first contactor 80. In normal use conditions, the first contactor 80 can be open, such that the first link 26 of the first charging station 12 is independent of the second link 50 of the second charging station 14.

In the event of an adverse operating condition that inhibits the first charging station 12 from providing DC electrical power to its first link 26, and to its first plurality of outputs 30, the first contactor 80 can be closed, for example as a result of a signal communicated by any of the system controller 11 and the controller 36 of the first charging station 12. Thus the first link 26 of the first charging station 12 and the second link 50 of the second charging station 14 can be electrically connected to one another. This may enable the second power converter 46 of the second charging station 14 to supply DC electrical power to the first link 26, and hence the first plurality of outputs 30, of the first charging station 12. In doing so, electric vehicles connected to the first plurality of outputs 30 of the first charging station 12 may still be charged in the event of an adverse operating condition that inhibits the first charging station 12 from providing DC electrical power to its first link 26, and to its first plurality of outputs 30.

It will also be appreciated that, in the event of an adverse operating condition that inhibits the second charging station 14 from providing DC electrical power to its second link 50, and its second plurality of outputs 54, the first contactor 80 can be closed to enable the first power converter 22 of the first charging station 12 to supply DC electrical power to the second link 50, and hence the second plurality of outputs 54, of the second charging station 14. In doing so, electric vehicles connected to the second plurality of outputs 54 of the second charging station 14 may still be charged in the event of an adverse operating condition that inhibits the second charging station 14 from providing DC electrical power to its second link 50, and to its second plurality of outputs 54.

Similarly the second link 28 of the first charging station 12 can be connected to the first link 72 of the fourth charging station 18 by a second contactor 82. In normal use conditions, the second contactor 82 can be open, such that the second link 28 of the first charging station 12 is independent of the first link 72 of the fourth charging station 18.

In the event of an adverse operating condition that inhibits the first charging station 12 from providing DC electrical power to its second link 28, and to its second plurality of outputs 32, the second contactor 82 can be closed, for example as a result of a signal communicated by any of the system controller 11 and the controller 36 of the first charging station 12. Thus, the second link 28 of the first charging station 12 and the first link 72 of the fourth charging station 18 can be electrically connected to one another. This may enable the first power converter 68 of the fourth charging station 18 to supply DC electrical power to the second link 28, and hence the second plurality of outputs 32, of the first charging station 12. In doing so, electric vehicles connected to the second plurality of outputs 32 of the first charging station 12 may still be charged in the event of an adverse operating condition that inhibits the first charging station 12 from providing DC electrical power to its second link 28, and to its second plurality of outputs 32.

It will also be appreciated that, in the event of an adverse operating condition that inhibits the fourth charging station 18 from providing DC electrical power to its first link 72, and its first plurality of outputs 76, the second contactor 82 can be closed to enable the second power converter 24 of the first charging station 12 to supply DC electrical power to the first link 72, and hence the first plurality of outputs 76, of the fourth charging station 18. In doing so, electric vehicles connected to the first plurality of outputs 76 of the fourth charging station 18 can still be charged in the event of an adverse operating condition that inhibits the fourth charging station 18 from providing DC electrical power to its first link 72, and to its first plurality of outputs 76.

In some examples, where an adverse operating condition inhibits the first charging station 12 from providing DC electrical power to its first link 26, and to its first plurality of outputs 30, and where an adverse operating condition inhibits the first charging station 12 from providing DC electrical power to its second link 28, and to its second plurality of outputs 32, the first contactor 80 and the second contactor 82 can be closed as described above.

In the example of FIG. 1 a third contactor 84 can be provided between the first link 48 of the second charging station 14 and the second link 62 of the third charging station 16, and a fourth contactor 86 can be provided between the first link 60 of the third charging station 16 and the second link 74 of the fourth charging station 18. The third 84 and fourth 86 contactors can provide similar functionality to that described above in relation to the first 80 and second 82 contactors. Although illustrated in FIG. 1 as a connected square, it will be appreciated that this is a schematic illustration, and that other layouts of the first 12, second 14, third 16 and fourth 18 charging stations are envisaged, with appropriate interconnection of links of the charging stations 12,14,16,18 dependent on the corresponding layout. With regards to use of contactors to increase charging speeds, it should be appreciated that any number of charging station(s) can be connected to any number of electric vehicle(s) within design parameters to avoid undue degradation of batteries or exceed interconnect capabilities, for example.

As seen in FIG. 1, in some examples the charging system can comprise pyro fuses 88, with a pyro fuse 88 located either side of each of the first 80, second 82, third 84 and fourth 86 contactors. The pyro fuses 88 can isolate the relevant links 26,28,48,50,60,62,72,74 from one another in the event of adverse operating conditions experienced by a respective charging station 12,14,16,18 when the relevant contactor 80,82,84,86 is closed. Although illustrated here as a pyro fuse, it will be appreciated that any appropriate fuse may be utilised.

With inclusion of contactors as discussed above, in some examples where the charging station comprises a first charging station, and the power converter comprises a first power converter, the method 200 comprises connecting the first and second outputs to a second power converter of a second charging station such that DC electrical power is providable from the second power converter to the first and second outputs of the first charging station, and charging the first and second electric vehicles using DC electrical power provided from the second power converter to the respective first and second outputs.

Similarly, in some examples where the charging station comprises a first charging station, and the power converter comprises a first power converter, the method 200 comprises connecting a third electric vehicle to a third output of the charging station, the charging station comprising a second power converter configured to convert a received third type of electrical power to a fourth type of electrical power different to the third type of electrical power, the fourth type of electrical power comprising DC electrical power, the power converter connected to the third output such that DC electrical power is providable to the third output; charging the third electric vehicle using DC electrical power provided from the second power converter to the third output; connecting the first and second outputs to a third power converter of a second charging station such that DC electrical power is providable from the third power converter of the second charging station to the first and second outputs; connecting the third output to a fourth power converter of a third charging station such that DC electrical power is providable from the fourth power converter of the third further charging station to the third output; charging the first and second electric vehicles using DC electrical power provided from the third power converter of the second charging station to the respective first and second outputs; and charging the third electric vehicle using DC electrical power provided from the fourth power converter of the third charging station to the third output.

In some examples, any of the charging stations 12,14,16, 18 can comprise additional sets of contactors to provide further functionality.

In some examples, the first charging station 12 can comprise contactors configured to: i) disconnect the first link 26 from the first power converter 22; ii) disconnect the second link 28 from the second power converter 24; iii) disconnect any of the first plurality of outputs 30 from the first link 26; and iv) disconnect any of the second plurality of outputs 32 from the second link 28. By providing such further contactors, outputs 30,32 of the first charging station can be disconnected from the appropriate power converters 22,24, for example where operation of any of the outputs 30,32 and the power converters 22,24 is impaired. Similar contactors can be implemented in any of the second 14, third 16 and fourth 18 charging stations.

In some examples the first charging station can comprise contactors configured to: i) connect the first link 26 to the second link 28; and ii) to connect any of the first plurality of outputs 30 to any of the second plurality of outputs 32. By providing such contactors any of the second 14 and fourth 18 charging stations can provide DC electrical power to all of the outputs 30,32 of the first charging station 12 where the appropriate first 80 and second 82 contactors are closed. Similar contactors can be implemented in any of the second 14, third 16 and fourth 18 charging stations.

Figure 10:
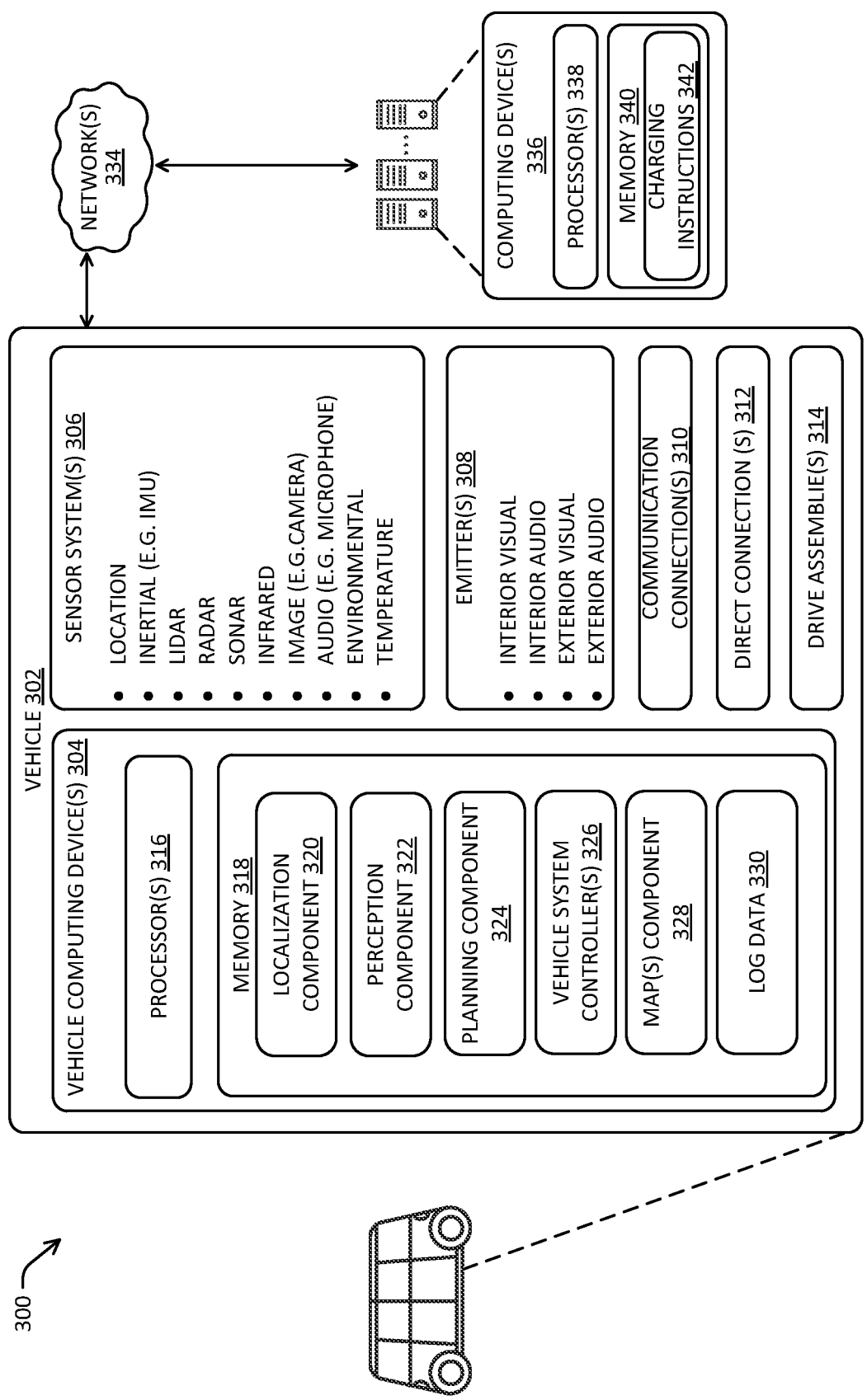
FIG. 10 is a schematic illustration of a system comprising a vehicle and one or more computing device(s).

FIG. 10 is a block diagram illustrating an example system 300 for implementing some of the various technologies described herein. In some examples, the system 300 may include one or multiple features, components, and/or functionality of examples described herein with reference to other figures.

The system 300 may include a vehicle 302. In some examples, the vehicle 302 can include some or all of the features, components, and/or functionality described above with respect to the electric vehicles 100,102,104,106,108. The vehicle 302 can comprise a bidirectional vehicle. As shown in FIG. 10, the vehicle 302 can also include a vehicle computing device 304, one or more sensor systems 304, one or more emitters 308, one or more communication connections 310, one or more direct connections 312, and/or one or more drive assemblies 314.

The vehicle computing device 304 can, in some examples, include one or more processors 316 and memory 318 communicatively coupled with the one or more processors 316. In examples, the one or more processors 316 may execute instructions stored in the memory 318 to perform one or more operations on behalf of the one or more vehicle computing devices 304.

The memory 318 of the one or more vehicle computing devices 304 can store a localization component 320, a perception component 322, a planning component 324, one or more vehicle system controllers 326, a map(s) component 328, and log data 330. Though depicted in FIG. 10 as residing in memory 318 for illustrative purposes, it is contemplated that the localization component 320, perception component 322, planning component 324, one or more vehicle system controllers 326, map(s) component 328, and/or the log data 330 can additionally, or alternatively, be accessible to the vehicle 302 (e.g., stored on, or otherwise accessible from, memory remote from the vehicle 302, such as memory 340 of one or more computing devices 336).

In at least one example, the localization component 320 can include functionality to receive data from the sensor system(s) 306 to determine a position and/or orientation of the vehicle 302 (e.g., one or more of an x-, y-, z-position, roll, pitch, or yaw). For example, the localization component 320 can include and/or request/receive a map of an environment and can continuously determine a location and/or orientation of the autonomous vehicle within the map. In some instances, the localization component 320 can utilize SLAM (simultaneous localization and mapping), CLAMS (calibration, localization and mapping, simultaneously), relative SLAM, bundle adjustment, non-linear least squares optimization, or the like based on image data, lidar data, radar data, IMU data, GPS data, wheel encoder data, and the like captured by the one or more sensor systems 306 or received from one or more other devices (e.g., computing devices 336) to accurately determine a location of the autonomous vehicle. In some instances, the localization component 320 can provide data to various components of the vehicle 302 to determine an initial position of the autonomous vehicle for generating a trajectory and/or for determining to retrieve map data. In various examples, the localization component 320 can provide data to a web-based application that may generate a data visualization associated with the vehicle 302 based at least in part on the data.

In some instances, the perception component 322 can include functionality to perform object tracking, detection, segmentation, and/or classification. In some examples, the perception component 322 can provide processed sensor data that indicates a presence of an entity that is proximate to the vehicle 302 and/or a classification of the entity as an entity type (e.g., car, pedestrian, cyclist, animal, building, tree, road surface, curb, sidewalk, unknown, etc.). In additional and/or alternative examples, the perception component 322 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc. In some instances, the perception component 322 may provide data to a web-based application that generates a data visualization associated with the vehicle 302 based at least in part on the data.

In general, the planning component 324 can determine a path for the vehicle 302 to follow to traverse through an environment. For example, the planning component 324 can determine various routes and trajectories and various levels of detail. For example, the planning component 324 can determine a route to travel from a first location (e.g., a current location) to a second location (e.g., a target location). For the purpose of this discussion, a route can be a sequence of waypoints for travelling between two locations. As examples, waypoints may include streets, intersections, global positioning system (GPS) coordinates, etc. Further, the planning component 324 can generate an instruction for guiding the autonomous vehicle along at least a portion of the route from the first location to the second location. In at least one example, the planning component 324 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 302 to navigate.

In at least one example, the vehicle computing device 304 can include one or more vehicle system controllers 326, which can be configured to control steering, propulsion, braking, safety, emitters, communication, components, and other systems of the vehicle 302. These vehicle system controller(s) 326 can communicate with and/or control corresponding systems of the drive assembly(s) 314 and/or other components of the vehicle 302. In some examples, the vehicle system controller(s) 326 can communicate with and/or control charging contactors of the vehicle to connect with outputs of the charging stations 12,14,16,18 as previously described.

The memory 318 can further include the map(s) component 328 to maintain and/or update one or more maps (not shown) that can be used by the vehicle 302 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the one or more maps can include at least one map (e.g., images and/or a mesh). In some examples, the vehicle 302 can be controlled based at least in part on the maps. That is, the maps can be used in connection with the localization component 320, the perception component 322, and/or the planning component 324 to determine a location of the vehicle 302, identify objects in an environment, and/or generate routes and/or trajectories to navigate within an environment. Additionally, the maps can be used in connection with the web-based application to generate content associated with the vehicle 302, such as a data visualization.

In some examples, the one or more maps can be stored on a remote computing device(s) (accessible via one or more network(s)). In some examples, multiple maps can be stored based on, for example, a characteristic (e.g., type of entity, time of day, day of week, season of the year, etc.). Storing multiple maps can have similar memory requirements but increase the speed at which data in a map can be accessed.

The memory 318 may also store log data 330 associated with the vehicle. For instance, the log data 330 may include one or more of diagnostic messages, notes, routes, etc. associated with the vehicle. By way of example, if information associated with a notification (e.g., diagnostic message) that is presented on a system interface of the user interface is copied and saved, the information may be stored in the log data 330.

In some instances, aspects of some or all of the memory-stored components discussed herein can include any models, algorithms, and/or machine learning algorithms. For example, in some instances, components in the memory 318 such as the localization component 320, the perception component 322, and/or the planning component 324 can be implemented as a neural network.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 306 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), image sensors (e.g., camera, RGB, IR, intensity, depth, etc.), audio sensors (e.g., microphones), wheel encoders, environment sensors (e.g., temperature sensors, humidity sensors, light sensors, pressure sensors, etc.), temperature sensors (e.g., for measuring temperatures of vehicle components), etc. The sensor system(s) 306 can include multiple instances of each of these or other types of sensors. For instance, the lidar sensors can include individual lidar sensors located at the corners, front, back, sides, and/or top of the vehicle 302. As another example, the image sensors can include multiple image sensors disposed at various locations about the exterior and/or interior of the vehicle 302. As an even further example, the audio sensors can include multiple audio sensors disposed at various locations about the exterior and/or interior of the vehicle 302. Additionally, the audio sensors can include an array of a plurality of audio sensors for determining directionality of audio data. The sensor system(s) 306 can provide input to the vehicle computing device 304. Additionally, or alternatively, the sensor system(s) 306 can send sensor data, via the one or more networks 334, to the one or more computing device(s) 336 at a particular frequency, after a lapse of a predetermined period of time, in near real-time, etc.

The vehicle 302 can also include one or more emitters 308 for emitting light and/or sound. The emitters 308 in this example include interior audio and visual emitters to communicate with passengers of the vehicle 302. By way of example, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 308 in this example also include exterior emitters. By way of example, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 302 can also include one or more communication connection(s) 310 that enable communication between the vehicle 302 and one or more other local or remote computing device(s). For instance, the communication connection(s) 310 can facilitate communication with other local computing device(s) on the vehicle 302 and/or the drive assembly(s) 314. Also, the communication connection(s) 310 can allow the vehicle 302 to communicate with other nearby computing device(s) (e.g., other nearby vehicles, traffic signals, laptop computers, etc.). The communications connection(s) 310 also enable the vehicle 302 to communicate with a remote teleoperations system or other remote services. In some examples the communication connection(s) 310 can enable communication of parameters indicative of a state of a battery of the vehicle 302, for example the state of charge and/or the open circuit voltage of the battery, to the system controller 11 of the charging system 10, or the controller 36 of the first charging station 12, previously described.

The communications connection(s) 310 can include physical and/or logical interfaces for connecting the vehicle computing device(s) 304 to another computing device (e.g., computing device(s) 336) and/or a network, such as network(s) 334. For example, the communications connection(s) 310 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the direct connection 312 of vehicle 302 can provide a physical interface to couple the one or more drive assembly(s) 314 with the body of the vehicle 302. For example, the direct connection 312 can allow the transfer of energy, fluids, air, data, etc. between the drive assembly(s) 314 and the vehicle 302. In some instances, the direct connection 312 can further releasably secure the drive assembly(s) 314 to the body of the vehicle 302.

In at least one example, the vehicle 302 can include one or more drive assemblies 314. In some examples, the vehicle 302 can have a single drive assembly 314. In at least one example, if the vehicle 302 has multiple drive assemblies 314, individual drive assemblies 314 can be positioned on opposite longitudinal ends of the vehicle 302 (e.g., the leading and trailing ends, the front and the rear, etc.).

The drive assembly(s) 314 can include many of the vehicle systems and/or components, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive assembly(s) 314 can include a drive assembly controller which can receive and preprocess data from the sensor system(s) and to control operation of the various vehicle systems. In some examples, the drive assembly controller can include one or more processors and memory communicatively coupled with the one or more processors. The memory can store one or more systems to perform various functionalities of the drive assembly(s) 314. Furthermore, the drive assembly(s) 314 can also include one or more communication connection(s) that enable communication by the respective drive assembly with one or more other local or remote computing device(s). In such a manner parameters relating to the drive assembly (s) 314, for example relating to the high voltage battery, can be transmitted to the computing device 336.

The computing device(s) 336 can include one or more processors 338 and memory 340 that may be communicatively coupled to the one or more processors 338. In some examples the computing device(s) 336 may be embodied as the system controller 11 or the controller 36 of the first charging station 12 previously described, and the memory 340 can store charging instructions 342 which can cause connection and/or disconnection of the vehicle 302 from any of the charging stations 12,14,16,18 of the charging system 10 as previously described.

The processor(s) 316 of the vehicle 302 and the processor (s) 338 of the computing device(s) 336 can be any suitable processor capable of executing instructions to process data and perform operations as described herein. By way of example and not limitation, the processor(s) 316 and 338 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 318 and 340 are examples of non-transitory computer-readable media. The memory 318 and 340 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component. It should be noted that while FIG. 10 is illustrated as a distributed system, in alternative examples, components of the vehicle 302 can be associated with the computing device(s) 336 and/or components of the computing device(s) 336 can be associated with the vehicle 302. That is, the vehicle 302 can perform one or more of the functions associated with the computing device(s) 336, and vice versa.

EXAMPLE CLAUSES

A: A method comprising: connecting a first electric vehicle to a first output of a charging station, the charging station comprising a power converter configured to convert a received first type of electrical power to a second type of electrical power electrical power different to the first type of electrical power, the second type of power comprising DC electrical power, the power converter connected to the first output such that DC electrical power is providable to the first output; charging the first electric vehicle using DC electrical power provided from the power converter to the first output; comparing a first parameter indicative of a current state of a first battery of the first autonomous electric vehicle to a second parameter indicative of a current state of a second battery of a second electric vehicle to be connected to a second output of the charging station, the power converter connected to the second output such that DC electrical power is providable to the second output; i) where the first parameter is greater than the second parameter: disconnecting the first electric vehicle from the first output and connecting the second electric vehicle to the second output; charging the second electric vehicle using DC electrical power provided from the power converter to the second output; where the second parameter reaches a level within a first pre-determined threshold of the first parameter, reconnecting the first electric vehicle to the first output; and simultaneously charging the first electric vehicle and the second electric vehicle using DC electrical power provided from the power converter to the respective first and second outputs; and ii) where the first parameter is less than the second parameter: waiting for the first parameter to reach a level within a second pre-determined threshold of the second parameter; connecting the second electric vehicle to the second output; and simultaneously charging the first electric vehicle and the second electric vehicle using DC electrical power supplied from the power converter to the respective first and second outputs.

B: The method of Clause A, wherein the power converter comprises a first power converter, and the method comprises: connecting a second power converter of the charging station to the second output, the second power converter connected to the second output such that DC electrical power is providable to the second output; and charging the second electric vehicle using DC electrical power provided from the first power converter to the second output and from the second power converter to the second output when the second electric vehicle is connected to the second output and the first electric vehicle is disconnected from the first output.

C: The method of Clause A, wherein the charging station comprises a first charging station, the power converter comprises a first power converter, and the method comprises: connecting the first and second outputs to a second power converter of a second charging station such that DC electrical power is providable from the second power converter to the first and second outputs of the first charging station, and charging the first and second electric vehicles using DC electrical power provided from the second power converter to the respective first and second outputs.

D: The method of Clause A, wherein the charging station comprises a first charging station, and the power converter comprises a first power converter, and the method comprises: connecting a third electric vehicle to a third output of the charging station, the charging station comprising a second power converter configured to convert a received third type of electrical power to a fourth type of electrical power different to the third type of electrical power, the fourth type of electrical power comprising DC electrical power, the power converter connected to the third output such that DC electrical power is providable to the third output; charging the third electric vehicle using DC electrical power provided from the second power converter to the third output; connecting the first and second outputs to a third power converter of a second charging station such that DC electrical power is providable from the third power converter of the second charging station to the first and second outputs; connecting the third output to a fourth power converter of a third charging station such that DC electrical power is providable from the fourth power converter of the third further charging station to the third output; charging the first and second electric vehicles using DC electrical power provided from the third power converter of the second charging station to the respective first and second outputs; and charging the third electric vehicle using DC electrical power provided from the fourth power converter of the third charging station to the third output.

E: A charging system comprising: a charging station comprising: an input configured to receive a first type of electrical power; a power converter connected to the input, the power converter configured to convert the first type of electrical power from the input to a second type of electrical power different to the first type of electrical power, the second type of electrical power comprising DC electrical power; and outputs connected to the power converter, the outputs configured such that DC electrical power is providable to each of the outputs simultaneously, each of the outputs configured to connect to a respective electric vehicle for charging of the electric vehicle.

F: The charging system of Clause E, wherein the power converter comprises a first power converter, the outputs comprise first outputs, and the charging station comprises: a second power converter connected to the input, the second power converter configured to convert the first type of electrical power from the input to a third type of electrical power different to the first type of electrical power, the third type of electrical power comprising DC electrical power; and second outputs connected to the second power converter, the second outputs configured such that DC electrical power is providable to each of the second outputs simultaneously, each of the second outputs configured to connect to a respective electric vehicle for charging of the electric vehicle.

G: The charging system of Clause F, wherein the first power converter and the second power converter are configured to be connectable such that DC electrical power is providable from the first power converter and the second power converter to any of the second outputs.

H: The charging system of Clause E, further comprising: a controller coupled to the charging station; and one or more non-transitory computer-readable media storing instructions executable by the controller, wherein the instructions configure the controller to perform actions comprising: controlling provision of DC electrical power to the outputs based on a parameter indicative of a state of a battery of an electric vehicle to be connected to one of the outputs.

I: The charging system of Clause H, wherein the power converter comprises a first power converter, the outputs comprise first outputs, and the charging station comprises: a second power converter connected to the input, the second power converter configured to convert the first type of electrical power from the input to a third type of electrical power different to the first type of electrical power, the third type of electrical power comprising DC electrical power; and second outputs connected to the second power converter, the second outputs configured such that DC electrical power is providable to each of the second outputs simultaneously, each of the second outputs configured to connect to a respective electric vehicle for charging of the electric vehicle; and wherein the instructions configure the controller to perform actions comprising: when an electric vehicle is connected to one of the first outputs and no electric vehicle is connected to the second outputs, cause provisioning of DC electrical power from the first power converter and the second power converter to the one of the first outputs to charge the electric vehicle connected to the one of the first outputs.

J: The charging system of Clause I, wherein the instructions configure the controller to perform actions comprising: in response to a state of charge associated with the vehicle connected to the one of the first outputs being below a threshold, cause provisioning of DC electrical power from the first power converter and the second power converter to the one of the first outputs to charge the electric vehicle connected to the output.

K: The charging system of Clause E, wherein the outputs are configured such that equal amounts of DC electrical power are providable to each of the outputs simultaneously.

L: The charging system of Clause E, wherein the charging station comprises: a controller coupled to the charging station; and one or more non-transitory computer-readable media storing instructions executable by the controller, wherein the instructions configure the controller to perform actions comprising: controlling connection of electric vehicles to the plurality of outputs based on a parameter indicative of a state of a battery of an electric vehicle already connected to a respective output.

M: The charging system of Clause E, wherein the charging station comprises: a controller coupled to the charging station; and one or more non-transitory computer-readable media storing instructions executable by the controller, wherein the instructions configure the controller to perform actions comprising: controlling connection of electric vehicles to the outputs based on a first parameter indicative of a state of a first battery of a first electric vehicle already connected to a first output of the outputs, and based on a second parameter indicative of a state of a second battery of a second electric vehicle to be connected to a second output of the outputs; and in response to the first parameter being greater than the second parameter: causing disconnection of the first electric vehicle from the first output; and causing connection of the second electric vehicle to the second output to charge the second electric vehicle.

N: The charging system of Clause L, wherein the power converter comprises a first power converter, the outputs comprise first outputs, and the charging station comprises: a second power converter connected to the input, the second power converter configured to convert the first type of electrical power from the input to a third type of electrical power different to the first type of electrical power, the third type of electrical power comprising DC electrical power; and second outputs connected to the second power converter, the second outputs configured such that DC electrical power is providable to each of the second outputs simultaneously, each of the second outputs configured to be connected to a respective electric vehicle; and wherein the instructions configure the controller to perform actions comprising: in response to first parameter being greater than the second parameter: causing disconnection of the first electric vehicle from the first output; causing connection of the second electric vehicle to the second output; and causing provisioning of DC electrical power from the second power converter to the second output for charging the second electric vehicle.

O: The charging system of Clause L, wherein the instructions configure the controller to perform actions comprising: in response to the second parameter subsequently reaching a level within a threshold of the first parameter, causing connection of the first electric vehicle to the first output for charging the first electric vehicle.

P: The system of Clause E, further comprising: a controller coupled to the charging station; and one or more non-transitory computer-readable media storing instructions executable by controller, wherein the instructions configured the controller to perform actions comprising any of: provisioning DC electric power to the outputs based, at least in part, on a time of day; and provisioning DC electrical power to the outputs based, at least in part, on a status of a fleet of electric vehicles to which an electric vehicle to be connected to one of the outputs belongs.

Q: The charging system of Clause E, wherein the charging station comprises a first charging station, and the charging system further comprises: a second charging station comprising: a second input configured to receive the first type of electrical power; a second power converter connected to the second input, the second power converter configured to convert the first type of electrical power to a third type of electrical power different to the first type of electrical power, the third type of electrical power comprising DC electrical power; and second outputs connected to the second power converter, the second outputs configured such that DC electrical power is providable to each of the second outputs simultaneously, each of the second outputs configured to connect to a respective electric vehicle for charging of the electric vehicle.

R: The charging system of Clause Q, further comprising: a controller coupled to the charging station; and one or more non-transitory computer-readable media storing instructions executable by controller, wherein the instructions configured the controller to perform actions comprising: causing connection of outputs of the first charging station to the second power converter such that DC electrical power is providable from the second power converter to the outputs of the first charging station.

S: The charging system of Clause Q, further comprising: a third charging station comprising: a third input configured to receive the first type of electrical power; and a third power converter connected to the third input, the power converter configured to convert received the received first type of electrical power at the input to a fourth type of electrical power different to the first type of electrical power, the fourth type of electrical power comprising DC electrical power; wherein the charging system comprises: a controller coupled to the first, second and third charging stations; and one or more non-transitory computer-readable media storing instructions executable by the controller, wherein the instructions configure the controller to perform actions comprising: causing connection of outputs of the first charging station to the second power converter of the second charging station such that DC electrical power is providable from the second power converter of the second charging station to the outputs of the first charging station; and causing connection of outputs of the first charging station to the third power converter of the third charging station such that DC electrical power is providable from the third power converter of the third charging station to the outputs.

T: One or more non-transitory computer-readable media storing instructions executable by one or more processors, wherein the instructions, when executed, cause the one or more processors to perform actions comprising: connecting a first electric vehicle to a first output of a charging station, the charging station comprising a power converter configured to convert a received first type of electrical power to a second type of electrical power electrical power different to the first type of electrical power, the second type of power comprising DC electrical power, the power converter connected to the first output such that DC electrical power is providable to the first output; charging the first electric vehicle using DC electrical power provided from the power converter to the first output; comparing a first parameter indicative of a current state of a first battery of the first autonomous electric vehicle to a second parameter indicative of a current state of a second battery of a second electric vehicle to be connected to a second output of the charging station, the power converter connected to the second output such that DC electrical power is providable to the second output; i) where the first parameter is greater than the second parameter, disconnecting the first electric vehicle from the first output and connecting the second electric vehicle to the second output; charging the second electric vehicle using DC electrical power provided from the power converter to the second output; where the second parameter reaches a level within a first pre-determined threshold of the first parameter, reconnecting the first electric vehicle to the first output; and simultaneously charging the first electric vehicle and the second electric vehicle using DC electrical power supplied from the power converter to the respective first and second outputs; and ii) where the first parameter is less than the second parameter, waiting for the first parameter to reach a level within a second pre-determined threshold of the second parameter; connecting the second electric vehicle to the second output; and simultaneously charging the first electric vehicle and the second electric vehicle using DC electrical power supplied from the power converter to the respective first and second outputs.

While the example clauses described above are described with respect to one particular implementation, it should be understood that, in the context of this document, the content of the example clauses can also be implemented via a method, device, system, computer-readable medium, and/or another implementation. Additionally, any of example clauses A-T may be implemented alone or in combination with any other one or more of the example clauses A-T.

What is claimed is:

1. A method comprising:
    connecting a first electric vehicle to a first output of a charging station, the charging station comprising a power converter configured to convert a received first type of electrical power to a second type of electrical power electrical power different to the first type of electrical power, the second type of power comprising DC electrical power, the power converter connected to the first output such that DC electrical power is providable to the first output; charging the first electric vehicle using DC electrical power provided from the power converter to the first output;
    comparing a first parameter indicative of a state of a first battery of the first electric vehicle to a second parameter indicative of a state of a second battery of a second electric vehicle, the second electric vehicle an autonomous electric vehicle;
    directing, based at least in part on comparing the first parameter indicative of the state of the first battery to the second parameter indicative of the state of charge of the second battery, the second electric vehicle to the charging station when the first electric vehicle is connected to the first output, the charging station comprising a communication module configured to transmit signals to autonomous electric vehicles;
  i. where the first parameter is greater than the second parameter:
    disconnecting the first electric vehicle from the first output and connecting the second electric vehicle to a second output of the charging station, the power converter connected to the second output such that DC electrical power is available to the second output;
    charging the second electric vehicle using DC electrical power provided from the power converter to the second output;
    where the second parameter reaches a level within a first pre-determined threshold of the first parameter, reconnecting the first electric vehicle to the first output; and
    simultaneously charging the first electric vehicle and the second electric vehicle using DC electrical power provided from the power converter to the respective first and second outputs; and
  ii. where the first parameter is less than the second parameter:
    waiting for the first parameter to reach a level within a second pre-determined threshold of the second parameter;
    connecting the second electric vehicle to the second output; and
    simultaneously charging the first electric vehicle and the second electric vehicle using DC electrical power supplied from the power converter to the respective first and second outputs.

2. The method of claim 1, wherein the power converter comprises a first power converter, and the method comprises:
  connecting a second power converter of the charging station to the second output, the second power converter connected to the second output such that DC electrical power is providable to the second output; and
  charging the second electric vehicle using DC electrical power provided from the first power converter to the second output and from the second power converter to the second output when the second electric vehicle is connected to the second output and the first electric vehicle is disconnected from the first output.

3. The method of claim 1, wherein the charging station comprises a first charging station, the power converter comprises a first power converter, and the method comprises:
  connecting the first and second outputs to a second power converter of a second charging station such that DC electrical power is providable from the second power converter to the first and second outputs of the first charging station, and charging the first and second electric vehicles using DC electrical power provided from the second power converter to the respective first and second outputs.

4. The method of claim 1, wherein the charging station comprises a first charging station, and the power converter comprises a first power converter, and the method comprises:
  connecting a third electric vehicle to a third output of the charging station, the charging station comprising a second power converter configured to convert a received third type of electrical power to a fourth type of electrical power different to the third type of electrical power, the fourth type of electrical power comprising DC electrical power, the power converter connected to the third output such that DC electrical power is providable to the third output;
  charging the third electric vehicle using DC electrical power provided from the second power converter to the third output;
  connecting the first and second outputs to a third power converter of a second charging station such that DC electrical power is providable from the third power converter of the second charging station to the first and second outputs;
  connecting the third output to a fourth power converter of a third charging station such that DC electrical power is providable from the fourth power converter of the third further charging station to the third output;
  charging the first and second electric vehicles using DC electrical power provided from the third power converter of the second charging station to the respective first and second outputs; and
  charging the third electric vehicle using DC electrical power provided from the fourth power converter of the third charging station to the third output.

5. A charging system comprising:
a charging station comprising:
  an input configured to receive a first type of electrical power;
  a power converter connected to the input, the power converter configured to convert the first type of electrical power from the input to a second type of electrical power different to the first type of electrical power, the second type of electrical power comprising DC electrical power; and
  outputs connected to the power converter, the outputs configured such that DC electrical power is providable to each of the outputs simultaneously from the power converter, each of the outputs configured to connect to a respective electric vehicle for charging of the electric vehicle, and a controller coupled to the charging station, the controller configured to:
  direct, when a first electric vehicle is connected to a first output of the outputs connected to the power converter, a second electric vehicle to the charging station based at least in part on a comparison of a state of charge of the first electric vehicle to a state of charge of the second electric vehicle, the second electric vehicle an autonomous electric vehicle, the charging station comprising a communication module configured to transmit signals to autonomous electric vehicles; and
  control, when the first electric vehicle and the second electric vehicle are connected to the outputs, provision of DC electrical power from the power converter simultaneously to the first electric vehicle and the second electric vehicle.

6. The charging system of claim 5, wherein the power converter comprises a first power converter, the outputs comprise first outputs, and the charging station comprises:
  a second power converter connected to the input, the second power converter configured to convert the first type of electrical power from the input to a third type of electrical power different to the first type of electrical power, the third type of electrical power comprising DC electrical power; and second outputs connected to the second power converter, the second outputs configured such that DC electrical power is providable to each of the second outputs simultaneously, each of the second outputs configured to connect to a respective electric vehicle for charging of the electric vehicle.

7. The charging system of claim 6, wherein the first power converter and the second power converter are configured to be connectable such that DC electrical power is providable from the first power converter and the second power converter to any of the second outputs.

8. The charging system of claim 5, further comprising:
one or more non-transitory computer-readable media storing instructions executable by the controller, wherein the instructions configure the controller to perform actions comprising:
controlling provision of DC electrical power to the outputs based on a parameter indicative of a state of a battery of an electric vehicle to be connected to one of the outputs.

9. The charging system of claim 8, wherein the power converter comprises a first power converter, the outputs comprise first outputs, and the charging station comprises:
a second power converter connected to the input, the second power converter configured to convert the first type of electrical power from the input to a third type of electrical power different to the first type of electrical power, the third type of electrical power comprising DC electrical power; and
second outputs connected to the second power converter, the second outputs configured such that DC electrical power is providable to each of the second outputs simultaneously, each of the second outputs configured to connect to a respective electric vehicle for charging of the electric vehicle; and
wherein the instructions configure the controller to perform actions comprising:
when an electric vehicle is connected to one of the first outputs and no electric vehicle is connected to the second outputs, cause provisioning of DC electrical power from the first power converter and the second power converter to the one of the first outputs to charge the electric vehicle connected to the one of the first outputs.

10. The charging system of claim 9, wherein the instructions configure the controller to perform actions comprising:
in response to a state of charge associated with the vehicle connected to the one of the first outputs being below a threshold, cause provisioning of DC electrical power from the first power converter and the second power converter to the one of the first outputs to charge the electric vehicle connected to the output.

11. The charging system of claim 5, wherein the outputs are configured such that equal amounts of DC electrical power are providable to each of the outputs simultaneously.

12. The charging system of claim 5, wherein the charging station comprises:
one or more non-transitory computer-readable media storing instructions executable by the controller, wherein the instructions configure the controller to perform actions comprising:
controlling connection of electric vehicles to the plurality of outputs based on a parameter indicative of a state of a battery of an electric vehicle already connected to a respective output.

13. The charging system of claim 5, wherein the charging station comprises:

one or more non-transitory computer-readable media storing instructions executable by the controller, wherein the instructions configure the controller to perform actions comprising:
controlling connection of electric vehicles to the outputs based on a first parameter indicative of a state of a first battery of a first electric vehicle already connected to a first output of the outputs, and based on a second parameter indicative of a state of a second battery of a second electric vehicle to be connected to a second output of the outputs; and
in response to the first parameter being greater than the second parameter:
causing disconnection of the first electric vehicle from the first output; and
causing connection of the second electric vehicle to the second output to charge the second electric vehicle.

14. The charging system of claim 13, wherein the power converter comprises a first power converter, the outputs comprise first outputs, and the charging station comprises:
a second power converter connected to the input, the second power converter configured to convert the first type of electrical power from the input to a third type of electrical power different to the first type of electrical power, the third type of electrical power comprising DC electrical power; and
second outputs connected to the second power converter, the second outputs configured such that DC electrical power is providable to each of the second outputs simultaneously, each of the second outputs configured to be connected to a respective electric vehicle; and
wherein the instructions configure the controller to perform actions comprising:
in response to the first parameter being greater than the second parameter:
causing disconnection of the first electric vehicle from the first output;
causing connection of the second electric vehicle to the second output; and
causing provisioning of DC electrical power from the second power converter to the second output for charging the second electric vehicle.

15. The charging system of claim 13, wherein the instructions configure the controller to perform actions comprising:
in response to the second parameter subsequently reaching a level within a threshold of the first parameter, causing connection of the first electric vehicle to the first output for charging the first electric vehicle.

16. The charging system of claim 5, further comprising:
one or more non-transitory computer-readable media storing instructions executable by controller, wherein the instructions configured the controller to perform actions comprising any of:
provisioning DC electric power to the outputs based, at least in part, on a time of day; and
provisioning DC electrical power to the outputs based, at least in part, on a status of a fleet of electric vehicles to which an electric vehicle to be connected to one of the outputs belongs.

17. The charging system of claim 5, wherein the charging station comprises a first charging station, and the charging system further comprises:
a second charging station comprising:
a second input configured to receive the first type of electrical power;
a second power converter connected to the second input, the second power converter configured to convert the first type of electrical power to a third type of electrical power different to the first type of electrical power, the third type of electrical power comprising DC electrical power; and second outputs connected to the second power converter, the second outputs configured such that DC electrical power is providable to each of the second outputs simultaneously, each of the second outputs configured to connect to a respective electric vehicle for charging of the electric vehicle.

18. One or more non-transitory computer-readable media storing instructions executable by one or more processors, wherein the instructions, when executed, cause the one or more processors to perform actions comprising:

connecting a first electric vehicle to a first output of a charging station, the charging station comprising a power converter configured to convert a received first type of electrical power to a second type of electrical power electrical power different to the first type of electrical power, the second type of power comprising DC electrical power, the power converter connected to the first output such that DC electrical power is providable to the first output;

charging the first electric vehicle using DC electrical power provided from the power converter to the first output;

comparing a first parameter indicative of a current state of a first battery of the first electric vehicle to a second parameter indicative of a current state of a second battery of a second electric vehicle, the second electric vehicle an autonomous electric vehicle;

directing, based at least in part on comparing the first parameter indicative of the state of the first battery to the second parameter indicative of the state of charge of the second battery, the second electric vehicle to the charging station when the first electric vehicle is connected to the first output, the charging station comprising a communication module configured to transmit signals to autonomous electric vehicles;

i. where the first parameter is greater than the second parameter, disconnecting the first electric vehicle from the first output and connecting the second electric vehicle to a second output of the charging station, the power converter connected to the second output such that DC electrical power is available to the second output;

charging the second electric vehicle using DC electrical power provided from the power converter to the second output;

where the second parameter reaches a level within a first pre-determined threshold of the first parameter, reconnecting the first electric vehicle to the first output; and simultaneously charging the first electric vehicle and the second electric vehicle using DC electrical power supplied from the power converter to the respective first and second outputs; and ii. where the first parameter is less than the second parameter, waiting for the first parameter to reach a level within a second pre-determined threshold of the second parameter;

connecting the second electric vehicle to the second output; and simultaneously charging the first electric vehicle and the second electric vehicle using DC electrical power supplied from the power converter to the respective first and second outputs.

19. The charging system of claim 5, wherein the controller is configured to direct the second electric vehicle to connect to the second output based at least in part on the state of charge of the second electric vehicle corresponding to to the state of charge of the first electric vehicle.

* * * * *